US012724252B2

(12) United States Patent
Ohtake et al.

(10) Patent No.: US 12,724,252 B2
(45) Date of Patent: Sep. 1, 2026

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventors: Fumiaki Ohtake, Tokyo (JP); Tomoyuki Sashima, Tokyo (JP); Takahiro Ishikawa, Kanagawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 18/272,576

(22) PCT Filed: Feb. 2, 2022

(86) PCT No.: PCT/JP2022/003964

§ 371 (c)(1),
(2) Date: Jul. 15, 2023

(87) PCT Pub. No.: WO2022/172821

PCT Pub. Date: Aug. 18, 2022

(65) Prior Publication Data

US 2024/0248288 A1 Jul. 25, 2024

(30) Foreign Application Priority Data

Feb. 12, 2021 (JP) ................................ 2021-020692

(51) Int. Cl.
*G02B 15/14* (2006.01)
*G02B 15/20* (2006.01)

(52) U.S. Cl.
CPC ............................ *G02B 15/144511* (2019.08)

(58) Field of Classification Search
CPC ................ G02B 9/04–10; G02B 13/04; G02B 15/142–1425; G02B 15/144511;
(Continued)

(56) References Cited

U.S. PATENT DOCUMENTS 4,465,343 A 8/1984 Horimoto
5,386,320 A 1/1995 Takada
(Continued)

FOREIGN PATENT DOCUMENTS

CN 102645735 A 8/2012
JP S56158316 A 12/1981
(Continued)

OTHER PUBLICATIONS

International Search Report for International Patent Application No. PCT/JP2022/003964, Apr. 26, 2022.
(Continued)

*Primary Examiner* — Thomas K Pham
*Assistant Examiner* — Kuei-Jen L Edenfield
(74) *Attorney, Agent, or Firm* — Potomac Law Group, PLLC

(57) ABSTRACT

A variable magnification optical system (ZL) comprises: a first lens group (G1) having negative refractive power; and a rear group (GR) including at least one lens group. When changing the magnification, the distances between adjacent lens groups change. At least one lens group of the rear group (GR) includes a final lens group (GE) having positive refractive power and disposed closest to the image side in the rear group (GR). The variable magnification optical system satisfies the following conditional expression. $0.15<ft/fGE<0.60$ where ft is the focal length of the variable magnification optical system (ZL) in a telephoto end state, and fGE is the focal length of the final lens group (GE).

20 Claims, 13 Drawing Sheets

(58) Field of Classification Search
CPC .... G02B 13/18; G02B 15/1461; G02B 15/20; G02B 15/14; G02B 15/143507; G02B 15/177
USPC ........ 359/682, 691–692, 748, 753, 793–795, 359/670, 675, 676, 683, 770, 783
See application file for complete search history.

(56) References Cited

U.S. PATENT DOCUMENTS

| | | | | |
|---|---|---|---|---|
| 6,515,805 | B2 * | 2/2003 | Hagimori | G02B 13/009 359/691 |
| 2001/0013979 | A1 | 8/2001 | Koreeda | |
| 2006/0083504 | A1 | 4/2006 | Matsusaka | |
| 2007/0171544 | A1 | 7/2007 | Noda | |
| 2007/0177277 | A1 * | 8/2007 | Sugita | G02B 15/145523 359/687 |
| 2011/0013071 | A1 | 1/2011 | Lin | |
| 2011/0279908 | A1 * | 11/2011 | Kon | G02B 15/144511 359/686 |
| 2012/0212833 | A1 | 8/2012 | Hosoi et al. | |
| 2012/0257285 | A1 * | 10/2012 | Kuzuhara | G02B 15/144515 359/686 |
| 2013/0201382 | A1 | 8/2013 | Ueda et al. | |
| 2014/0036137 | A1 * | 2/2014 | Inoue | G02B 27/646 359/557 |
| 2015/0009577 | A1 * | 1/2015 | Ueda | G02B 13/009 359/680 |
| 2019/0302432 | A1 | 10/2019 | Iwasawa et al. | |
| 2019/0312999 | A1 | 10/2019 | Kurioka et al. | |
| 2019/0324229 | A1 | 10/2019 | Kikuchi | |
| 2020/0371326 | A1 * | 11/2020 | Okuoka | G02B 15/145523 |
| 2021/0223523 | A1 | 7/2021 | Abe | |
| 2021/0278643 | A1 | 9/2021 | Komatsubara et al. | |

FOREIGN PATENT DOCUMENTS

| | | | |
|---|---|---|---|
| JP | S5719710 | A | 2/1982 |
| JP | H05-134181 | A | 5/1993 |
| JP | 2001-290075 | A | 10/2001 |
| JP | 2002-098892 | A | 4/2002 |
| JP | 2006-113404 | A | 4/2006 |
| JP | 2007-193140 | A | 8/2007 |
| JP | 2011-033895 | A | 2/2011 |
| JP | 2012173298 | A | 9/2012 |
| JP | 2019-179082 | A | 10/2019 |
| JP | 2019191307 | A | 10/2019 |
| JP | 2020-134785 | A | 8/2020 |
| WO | 2018/123672 | A1 | 7/2018 |
| WO | 2019235471 | A1 | 12/2019 |
| WO | 2020012638 | A1 | 1/2020 |

OTHER PUBLICATIONS

International Preliminary Report on Patentability for International Patent Application No. PCT/JP2022/003964, Aug. 24, 2023.

Office Action issued Jun. 4, 2024, in Japanese Patent Application No. 2022-580574.

Office Action issued Jan. 7, 2025, in Japanese Patent Application No. 2022-580574.

Office Action issued Mar. 3, 2026, in Japanese Patent Application No. 2025-083049.

Office Action issued Mar. 13, 2026, in Chinese Patent Application No. 202280012052.3.

Office Action issued Jul. 21, 2026, in Japanese Patent Application No. 2025-083049.

* cited by examiner

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus, and a method for manufacturing the zoom optical system.

TECHNICAL BACKGROUND

Conventionally, a zoom optical system that is suitable for a photographing camera, an electronic still camera, a video camera, and the like has been proposed (for example, refer to Patent literature 1). It is difficult to achieve favorable optical performance with such a zoom optical system in a small size.

PRIOR ARTS LIST

Patent Document

Patent literature 1: WO2020/012638

SUMMARY OF THE INVENTION

A zoom optical system according to a first invention consists of a first lens group having negative refractive power and a rear group comprising at least one lens group, which are arranged in order from an object side along an optical axis, distances between the lens groups adjacent to each other change at zooming, the at least one lens group in the rear group includes a final lens group having positive refractive power and disposed closest to an image side in the rear group, and the following conditional expression is satisfied, $$0.15 < ft / fGE < 0.60$$

where, ft: a focal length of the zoom optical system in a telephoto end state, and fGE: a focal length of the final lens group.

A zoom optical system according to a second invention consists of a first lens group having negative refractive power and a rear group comprising at least one lens group, which are arranged in order from an object side along an optical axis, distances between the lens groups adjacent to each other change at zooming, and the following conditional expressions are satisfied, $$2.00 < TLt / IHw < 3.00$$

$$1.00 < (-f1) / fRw < 1.50$$

where,

TLt: an entire length of the zoom optical system in a telephoto end state,

IHw: a maximum image height of the zoom optical system in a wide-angle end state, f1: a focal length of the first lens group, and fRw: a focal length of the rear group in the wide-angle end state.

An optical apparatus according to the present invention comprises an above-described zoom optical system.

A first method according to the present invention for manufacturing a zoom optical system consisting of a first lens group having negative refractive power and a rear group comprising at least one lens group, which are arranged in order from an object side along an optical axis, comprises a step of disposing the lens groups in a lens barrel so that;

distances between the lens groups adjacent to each other change at zooming, the at least one lens group in the rear group includes a final lens group having positive refractive power and disposed closest to an image side in the rear group, and the following conditional expression is satisfied, $$0.15 < ft / fGE < 0.60$$

where, ft: a focal length of the zoom optical system in a telephoto end state, and EGE: a focal length of the final lens group.

A second method according to the present invention for manufacturing a zoom optical system consisting of a first lens group having negative refractive power and a rear group comprising at least one lens group, which are arranged in order from an object side along an optical axis, comprises a step of disposing the lens groups in a lens barrel so that;

distances between the lens groups adjacent to each other change at zooming, and the following conditional expressions are satisfied, $$2.00 < TLt / IHw < 3.00$$

$$1.00 < (-f1) / fRw < 1.50$$

where,

TLt: an entire length of the zoom optical system in a telephoto end state,

IHw: a maximum image height of the zoom optical system in a wide-angle end state, f1: a focal length of the first lens group, and fRw: a focal length of the rear group in the wide-angle end state.

DESCRIPTION OF THE EMBODIMENTS

Figure 11:
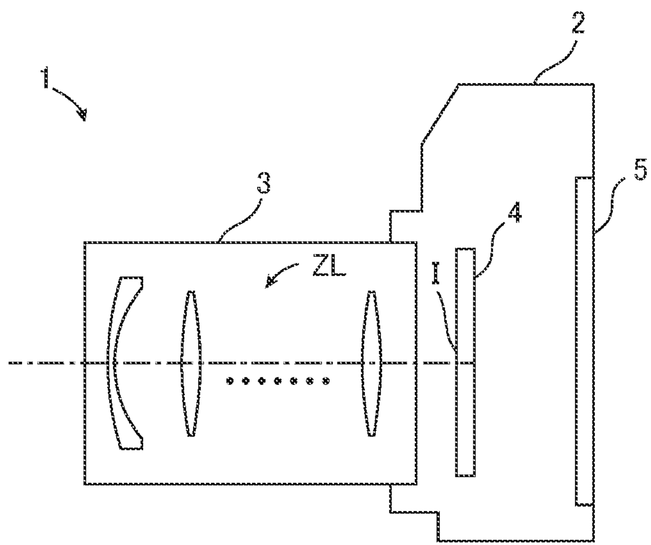
FIG. 11 is a diagram showing the configuration of a camera comprising a zoom optical system according to each embodiment.

Preferable embodiments according to the present invention will be described below. First, a camera (optical apparatus) comprising a zoom optical system according to each embodiment will be described below with reference to FIG. 11. As shown in FIG. 11, this camera 1 comprises a body 2 and a photographing lens 3 mounted on the body 2. The body 2 includes an image capturing element 4, a body control unit (not shown) configured to control digital camera operation, and a liquid crystal screen 5. The photographing lens 3 includes a zoom optical system ZL including a plurality of lens groups, and a lens position control mechanism (not shown) configured to control the position of each lens group. The lens position control mechanism includes a sensor configured to detect the position of each lens group, a motor configured to move each lens group forward and backward along an optical axis, a control circuit configured to drive the motor and the like.

Light from an object is collected by the zoom optical system ZL of the photographing lens 3 and incident on an image surface I of the image capturing element 4. After being incident on the image surface I, the light from the object is photoelectrically converted by the image capturing element 4 and recorded as digital image data in a non-shown memory. The digital image data recorded in the memory can be displayed on the liquid crystal screen 5 in accordance with an operation by a user. Note that the camera may be a mirrorless camera or may be a single-lens reflex camera including a quick return mirror. The zoom optical system ZL shown in FIG. 11 schematically indicates the zoom optical system included in the photographing lens 3, and a lens configuration of the zoom optical system ZL is not limited to this configuration.

Figure 1:
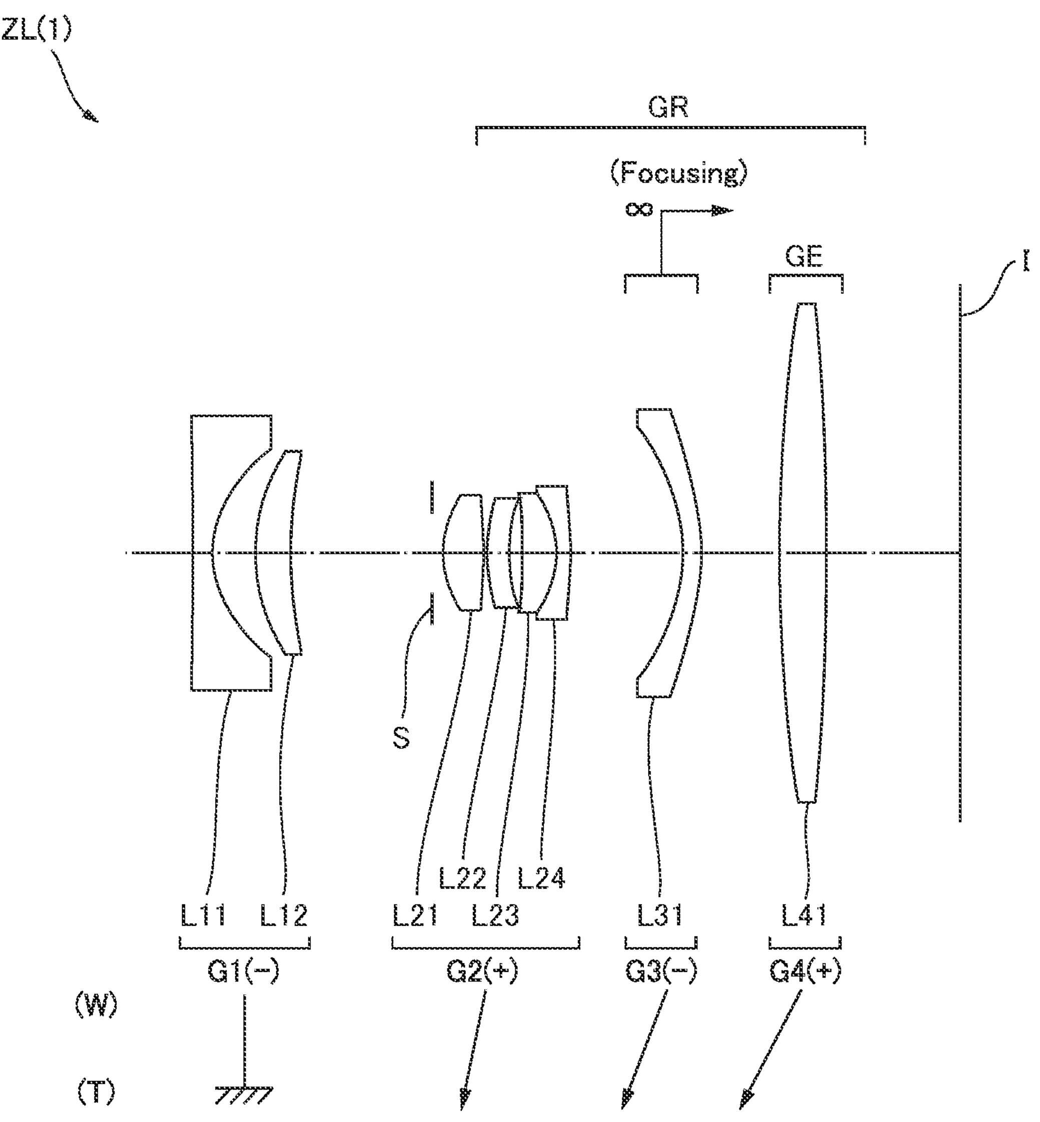
FIG. 1 is a diagram showing a lens configuration of a zoom optical system according to a first example.

A zoom optical system according to a first embodiment will be described below. As shown in FIG. 1, a zoom optical system ZL(1) as an exemplary zoom optical system (zoom lens) ZL according to the first embodiment consists of a first lens group G1 having negative refractive power and a rear group GR including at least one lens group, the lens groups being arranged in order from an object side along the optical axis. The distances between the lens groups adjacent to each other change at zooming. The at least one lens group in the rear group GR includes a final lens group GE having positive refractive power and disposed closest to an image side in the rear group GR.

With the above-described configuration, the zoom optical system ZL according to the first embodiment satisfies the following conditional expression (1).

$$0.15 < ft/fGE < 0.60 \quad (1)$$

where, ft: the focal length of the zoom optical system ZL in a telephoto end state, and fGE: the focal length of the final lens group GE.

According to the first embodiment, it is possible to obtain zoom optical system having a small size and favorable optical performance and an optical apparatus comprising the zoom optical system. The zoom optical system ZL according to the first embodiment may be a zoom optical system ZL(2) shown in FIG. 3, a zoom optical system ZL(3) shown in FIG. 5, a zoom optical system ZL(4) shown in FIG. 7, or a zoom optical system ZL(5) shown in FIG. 9.

Conditional Expression (1)) defines an appropriate relation between the focal length of the zoom optical system ZL in the telephoto end state and the focal length of the final lens group GE. When Conditional Expression (1) is satisfied, it is possible to excellently correct curvature of field with the zoom optical system in a small size.

When the correspondence value of Conditional Expression (1) exceeds its upper limit value, it is difficult to correct curvature of field. Furthermore, the incident angle of a light beam with respect to the image surface (image capturing element) is large, and thus it is difficult to prevent shading. It is possible to secure the advantageous effect of the present embodiment by setting the upper limit value of Conditional Expression (1) to 0.55, 0.50, 0.47, 0.43, and 0.40.

When the correspondence value of Conditional Expression (1) is below its lower limit value, it is difficult to correct curvature of field and coma aberration. It is possible to secure the advantageous effect of the present embodiment by setting the lower limit value of Conditional Expression (1) to 0.20, 0.24, 0.27, 0.30, and 0.32.

A zoom optical system according to a second embodiment will be described below. As shown in FIG. 1, the zoom optical system ZL(1) as an exemplary zoom optical system (zoom lens) ZL according to the second embodiment consists of the first lens group G1 having negative refractive power and the rear group GR including at least one lens group, the lens groups being arranged in order from the object side along the optical axis. The distances between the lens groups adjacent to each other change at zooming.

With the above-described configuration, the zoom optical system ZL according to the second embodiment satisfies the following conditional expressions (2) and (3).

$$2.00 < TLt/IHw < 3.00 \quad (2)$$

$$1.00 < (-f1)/fRw < 1.50 \quad (3)$$

where,

TLt: the entire length of the zoom optical system ZL in the telephoto end state, IHw: the maximum image height of the zoom optical system ZL in a wide-angle end state, f1: the focal length of the first lens group G1, and fRw: the focal length of the rear group GR in the wide-angle end state.

According to the second embodiment, it is possible to obtain a zoom optical system having a small size and favorable optical performance and an optical apparatus comprising the zoom optical system. The zoom optical system ZL according to the second embodiment may be the zoom optical system ZL(2) shown in FIG. 3, the zoom optical system ZL(3) shown in FIG. 5, the zoom optical system ZL(4) shown in FIG. 7, or the zoom optical system ZL(5) shown in FIG. 9.

Conditional Expression (2) defines an appropriate relation between the entire length of the zoom optical system ZL in the telephoto end state and the maximum image height of the zoom optical system ZL in the wide-angle end state. When Conditional Expression (2) is satisfied, it is possible to obtain a zoom optical system having a small size as compared to the size of the image surface (image capturing element).

When the correspondence value of Conditional Expression (2) exceeds its upper limit value, the entire length of the zoom optical system ZL is large, and thus it is difficult to obtain favorable optical performance with the zoom optical system ZL in a small size. It is possible to secure the advantageous effect of the present embodiment by setting the upper limit value of Conditional Expression (2) to 2.90, 2.80, 2.70, 2.65, and 2.60.

When the correspondence value of Conditional Expression (2) is below its lower limit value, the entire length of the zoom optical system ZL is too small, and thus it is difficult to correct coma aberration and curvature of field. It is possible to secure the advantageous effect of the present embodiment by setting the lower limit value of Conditional Expression (2) to 2.10, 2.20, 2.30, 2.40, and 2.45.

Conditional Expression (3) defines an appropriate relation between the focal length of the first lens group G1 and the focal length of the rear group GR in the wide-angle end state. When Conditional Expression (3) is satisfied, it is possible to obtain favorable optical performance in the entire range of zooming with the zoom optical system in a small size.

When the correspondence value of Conditional Expression (3) exceeds its upper limit value, it is difficult to correct spherical aberration and coma aberration. It is possible to secure the advantageous effect of the present embodiment by setting the upper limit value of Conditional Expression (3) to 1.45, 1.40, 1.36, 1.33, and 1.30.

When the correspondence value of Conditional Expression (3) is below its lower limit value, it is difficult to correct spherical aberration and curvature of field. It is possible to secure the advantageous effect of the present embodiment by setting the lower limit value of Conditional Expression (3) to 1.05, 1.10, 1.12, 1.15, and 1.18.

In the zoom optical system ZL according to the second embodiment, the at least one lens group in the rear group GR preferably includes the final lens group GE having positive refractive power and disposed closest to the image side in the rear group GR. Accordingly, a variety of aberrations can be excellently corrected.

The zoom optical system ZL according to the first embodiment may satisfy Conditional Expression (2) described above. Similarly to the second embodiment, when Conditional Expression (2) is satisfied, it is possible to obtain a zoom optical system having a small size as compared to the size of the image surface (image capturing element). It is possible to secure the advantageous effect of the first embodiment by setting the upper limit value of Conditional Expression (2) to 2.90, 2.80, 2.70, 2.65, and 2.60. Moreover, it is possible to secure the advantageous effect of the first embodiment by setting the lower limit value of Conditional Expression (2) to 2.10, 2.20, 2.30, 2.40, and 2.45.

The zoom optical system ZL according to the first embodiment may satisfy Conditional Expression (3) described above. Similarly to the second embodiment, when Conditional Expression (3) is satisfied, it is possible to obtain favorable optical performance in the entire range of zooming with the zoom optical system ZL in a small size. It is possible to secure the advantageous effect of the first embodiment by setting the upper limit value of Conditional Expression (3) to 1.45, 1.40, 1.36, 1.33, and 1.30. Moreover, it is possible to secure the advantageous effect of the first embodiment by setting the lower limit value of Conditional Expression (3) to 1.05, 1.10, 1.12, 1.15, and 1.18.

The zoom optical system ZL according to each of the first and second embodiments preferably satisfies the following conditional expression (4).

$$0.30 < Bfw/IHw < 0.60 \tag{4}$$

where,

Bfw: the back focus of the zoom optical system ZL in the wide-angle end state, and IHw: the maximum image height of the zoom optical system ZL in the wide-angle end state.

Conditional Expression (4) defines an appropriate relation between the back focus of the zoom optical system ZL in the wide-angle end state and the maximum image height of the zoom optical system ZL in the wide-angle end state. When Conditional Expression (5) is satisfied, curvature of field can be excellently corrected.

When the correspondence value of Conditional Expression (4) exceeds its upper limit value, the back focus of the zoom optical system ZL is too long, and thus it is difficult to correct curvature of field with the zoom optical system ZL in a small size. It is possible to secure the advantageous effect of each embodiment by setting the upper limit value of Conditional Expression (4) to 0.56, 0.53, 0.50, 0.48, and 0.46.

When the correspondence value of Conditional Expression (4) is below its lower limit value, the back focus of the zoom optical system ZL is too short, and thus the zoom optical system ZL interferes with the body of the camera and is not suitable for practical use. It is possible to secure the advantageous effect of each embodiment by setting the lower limit value of Conditional Expression (4) to 0.32, 0.35, 0.37, 0.40, and 0.42.

The zoom optical system ZL according to each of the first and second embodiments preferably satisfies the following conditional expression (5).

$$0.50 < YLE1/IHw < 1.00 \tag{5}$$

where,

YLE1: the effective radius of a lens surface of a lens disposed closest to the image side in the zoom optical system ZL, the lens surface being positioned on the object side, and IHw: the maximum image height of the zoom optical system ZL in the wide-angle end state.

Conditional Expression (5) defines an appropriate relation between the effective radius of the object-side lens surface of the lens disposed closest to the image side in the zoom optical system ZL and the maximum image height of the zoom optical system ZL in the wide-angle end state. Hereinafter, the lens disposed closest to the image side in the zoom optical system ZL is also referred to as a final lens. When Conditional Expression (5) is satisfied, peripheral illumination can be ensured.

When the correspondence value of Conditional Expression (5) exceeds its upper limit value, the effective radius of the object-side lens surface of the final lens is large, and thus it is difficult to obtain favorable optical performance with the zoom optical system ZL in a small size. It is possible to secure the advantageous effect of each embodiment by setting the upper limit value of Conditional Expression (5) to 0.95, 0.90, 0.85, 0.82, and 0.78.

When the correspondence value of Conditional Expression (5) is below its lower limit value, the effective diameter of the object-side lens surface of the final lens decreases, and thus it is difficult to ensure peripheral illumination. It is possible to secure the advantageous effect of each embodiment by setting the lower limit value of Conditional Expression (5) to 0.55, 0.60, 0.65, 0.68, and 0.72.

The zoom optical system ZL according to each of the first and second embodiments preferably satisfies the following conditional expression (6).

$$0.80 < (-f1)/fw < 1.40 \tag{6}$$

where, f1: the focal length of the first lens group G1, and fw: the focal length of the zoom optical system ZL in the wide-angle end state.

Conditional Expression (6) defines an appropriate relation between the focal length of the first lens group G1 and the focal length of the zoom optical system ZL in the wide-angle end state. When Conditional Expression (6) is satisfied, it is possible to excellently correct a variety of aberrations such as coma aberration with the zoom optical system in a small size.

When the correspondence value of Conditional Expression (6) exceeds its upper limit value, the refractive power of the first lens group G1 is too weak, and thus it is difficult to correct a variety of aberrations with the zoom optical system ZL in a small size. It is possible to secure the advantageous effect of each embodiment by setting the upper limit value of Conditional Expression (6) to 1.35, 1.30, 1.27, 1.24, and 1.22.

When the correspondence value of Conditional Expression (6) is below its lower limit value, the refractive power of the first lens group G1 is too strong, and thus it is difficult to correct coma aberration. It is possible to secure the advantageous effect of each embodiment by setting the lower limit value of Conditional Expression (6) to 0.85, 0.90, 0.95, 1.00, and 1.05.

In the zoom optical system ZL according to each of the first and second embodiments, the at least one lens group in the rear group GR preferably includes a second lens group G2 having positive refractive power and disposed closest to the object side in the rear group GR, and the following conditional expression (7) is preferably satisfied.

$$0.50 < f2/fw < 1.00 \tag{7}$$

where, f2: the focal length of the second lens group G2, and fw: the focal length of the zoom optical system ZL in the wide-angle end state.

Conditional Expression (7) defines an appropriate relation between the focal length of the second lens group G2 and the focal length of the zoom optical system ZL in the wide-angle end state. When Conditional Expression (7) is satisfied, it is possible to excellently correct a variety of aberrations such as spherical aberration with the zoom optical system in a small size.

When the correspondence value of Conditional Expression (7) exceeds its upper limit value, the refractive power of the second lens group G2 is too weak, and thus it is difficult to correct a variety of aberrations with the zoom optical system ZL in a small size. It is possible to secure the advantageous effect of each embodiment by setting the upper limit value of Conditional Expression (7) to 0.95, 0.90, 0.87, and 0.85.

When the correspondence value of Conditional Expression (7) is below its lower limit value, the refractive power of the second lens group G2 is too strong, and thus it is difficult to correct spherical aberration. It is possible to secure the advantageous effect of each embodiment by setting the lower limit value of Conditional Expression (7) to 0.55, 0.60, 0.65, 0.70, and 0.73.

In the zoom optical system ZL according to each of the first and second embodiments, the at least one lens group in the rear group GR preferably includes the second lens group G2 having positive refractive power and disposed closest to the object side in the rear group GR, and the following conditional expression (8) is preferably satisfied.

$$0.60 < f2/fRw < 1.20 \tag{8}$$

where, f2: the focal length of the second lens group G2, and fRw: the focal length of the rear group GR in the wide-angle end state.

Conditional Expression (8) defines an appropriate relation between the focal length of the second lens group G2 and the focal length of the rear group GR in the wide-angle end state. When Conditional Expression (8) is satisfied, it is possible to excellently correct a variety of aberrations such as curvature of field and spherical aberration with the zoom optical system in a small size.

When the correspondence value of Conditional Expression (8) exceeds its upper limit value, the refractive power of the second lens group G2 is too weak, and thus it is difficult to correct curvature of field. It is possible to secure the advantageous effect of each embodiment by setting the upper limit value of Conditional Expression (8) to 1.15, 1.10, 1.05, 1.00, and 0.95.

When the correspondence value of Conditional Expression (8) is below its lower limit value, the refractive power of the second lens group G2 is too strong, and thus it is difficult to correct spherical aberration. It is possible to secure the advantageous effect of each embodiment by setting the lower limit value of Conditional Expression (8) to 0.65, 0.70, 0.75, 0.78, and 0.82.

The zoom optical system ZL according to each of the first and second embodiments preferably satisfies the following conditional expression (9).

$$1.10 < ft/fw < 1.50 \quad (9)$$

where, ft: the focal length of the zoom optical system ZL in the telephoto end state, and fw: the focal length of the zoom optical system ZL in the wide-angle end state.

Conditional Expression (9) defines an appropriate range of the zooming ratio of the zoom optical system ZL. When Conditional Expression (9) is satisfied, it is possible to excellently correct a variety of aberrations with the zoom optical system in a small size.

When the correspondence value of Conditional Expression (9) exceeds its upper limit value, the zooming ratio of the zoom optical system ZL is large, and thus it is difficult to correct a variety of aberrations with the zoom optical system ZL in a small size. It is possible to secure the advantageous effect of each embodiment by setting the upper limit value of Conditional Expression (9) to 1.45, 1.40, 1.37, 1.33, and 1.30.

When the correspondence value of Conditional Expression (9) is below its lower limit value, the zooming ratio of the zoom optical system ZL is too small, and thus the zoom optical system ZL does not serve as a zoom optical system (zoom lens). It is possible to secure the advantageous effect of each embodiment by setting the lower limit value of Conditional Expression (9) to 1.15, 1.18, 1.20, 1.22, and 1.25.

The zoom optical system ZL according to each of the first and second embodiments satisfies the following preferably conditional expression (10).

$$-1.50 < (L1r2 + L1r1)/(L1r2 - L1r1) < -0.60 \quad (10)$$

where,

L1r1: the radius of curvature of a lens surface of a lens disposed closest to the object side in the zoom optical system ZL, the lens surface being positioned on the object side, and L1r2: the radius of curvature of a lens surface of the lens disposed closest to the object side in the zoom optical system ZL, the lens surface being positioned on the image side.

Conditional Expression (10) defines an appropriate range of the shape factor of the lens disposed closest to the object side in the zoom optical system ZL. When Conditional Expression (10) is satisfied, it is possible to excellently correct curvature of field, distortion, spherical aberration, coma aberration, and the like with the zoom optical system in a small size.

When the correspondence value of Conditional Expression (10) exceeds its upper limit value, it is difficult to correct curvature of field and distortion. It is possible to secure the advantageous effect of each embodiment by setting the upper limit value of Conditional Expression (10) to −0.65, −0.70, −0.75, and −0.80.

When the correspondence value of Conditional Expression (10) is below its lower limit value, it is difficult to correct spherical aberration and coma aberration. It is possible to secure the advantageous effect of each embodiment by setting the lower limit value of Conditional Expression (10) to −1.45, −1.40, −1.35, −1.30, and −1.25.

The zoom optical system ZL according to each of the first and second embodiments preferably satisfies the following conditional expression (11).

$$-0.50 < (LEr2 + LEr1)/(LEr2 - LEr1) < 0.60 \quad (11)$$

where,

LEr1: the radius of curvature of the object-side lens surface of the lens disposed closest to the image side in the zoom optical system ZL, and LEr2: the radius of curvature of the image-side lens surface of the lens disposed closest to the image side in the zoom optical system ZL.

Conditional Expression (11) defines an appropriate range of the shape factor of the lens (final lens) disposed closest to the image side in the zoom optical system ZL. When Conditional Expression (11) is satisfied, it is possible to excellently correct coma aberration and curvature of field with the zoom optical system in a small size.

When the correspondence value of Conditional Expression (11) exceeds its upper limit value, it is difficult to correct coma aberration. It is possible to secure the advantageous effect of each embodiment by setting the upper limit value of Conditional Expression (11) to 0.55, 0.50, 0.45, 0.40, and 0.38.

When the correspondence value of Conditional Expression (11) is below its lower limit value, it is difficult to correct curvature of field. It is possible to secure the advantageous effect of each embodiment by setting the lower limit value of Conditional Expression (11) to −0.45, −0.40, −0.35, −0.30, and −0.25.

The zoom optical system ZL according to each of the first and second embodiments preferably further comprises an aperture stop disposed between the first lens group G1 and the rear group GR. Accordingly, shading can be prevented.

The zoom optical system ZL according to each of the first and second embodiments preferably satisfies the following conditional expression (12).

$$80.00° < 2\omega w \quad (12)$$

where,

2ωw: the full angle of view of the zoom optical system ZL in the wide-angle end state.

Conditional Expression (12) defines an appropriate range of the full angle of view of the zoom optical system ZL in the wide-angle end state. When Conditional Expression (12) is satisfied, the zoom optical system has a wide angle of view, which is preferable. It is possible to secure the advantageous effect of each embodiment by setting the lower limit value of Conditional Expression (12) to 90.00°, 92.00°, 94.00°, 96.00°, and 98.00°. It is possible to secure the advantageous effect of each embodiment by setting the upper limit value of Conditional Expression (12) to 114.00°, 110.00°, 107.00°, 104.00°, and 102.00°.

The zoom optical system ZL according to each of the first and second embodiments preferably satisfies the following conditional expression (13).

$$0.01 < D1/TLw < 0.20 \quad (13)$$

where,

D1: the thickness of the first lens group G1 on the optical axis, and

TLw: the entire length of the zoom optical system ZL in the wide-angle end state.

Conditional Expression (13) defines an appropriate relation between the thickness of the first lens group G1 on the optical axis and the entire length of the zoom optical system ZL in the wide-angle end state. When Conditional Expression (13) is satisfied, it is possible to excellently correct a variety of aberrations such as curvature of field and spherical aberration with the zoom optical system in a small size.

When the correspondence value of Conditional Expression (13) exceeds its upper limit value, it is difficult to correct a variety of aberrations such as curvature of field and spherical aberration while maintaining a small size. It is possible to secure the advantageous effect of each embodiment by setting the upper limit value of Conditional Expression (13) to 0.19, 0.18 and 0.17.

When the correspondence value of Conditional Expression (13) is below its lower limit value, it is difficult to correct a variety of aberrations such as curvature of field and spherical aberration. It is possible to secure the advantageous effect of each embodiment by setting the lower limit value of Conditional Expression (13) to 0.03, 0.05 and 0.10.

The zoom optical system ZL according to each of the first and second embodiments preferably satisfies the following conditional expression (14).

$$0.10 < Bfw/fw < 0.60 \quad (14)$$

where,

Bfw: the back focus of the zoom optical system ZL in the wide-angle end state, and fw: the focal length of the zoom optical system ZL in the wide-angle end state.

Conditional Expression (14) defines the relation between the back focus and focal length of the zoom optical system ZL in the wide-angle end state. It is possible to secure the advantageous effect of each embodiment by setting the upper limit value of Conditional Expression (14) to 0.58, 0.55, 0.53, and 0.50. Moreover, it is possible to secure the advantageous effect of each embodiment by setting the lower limit value of Conditional Expression (14) to 0.15, 0.20, 0.25, 0.30, 0.35, 0.40, and 0.45.

Figure 12:
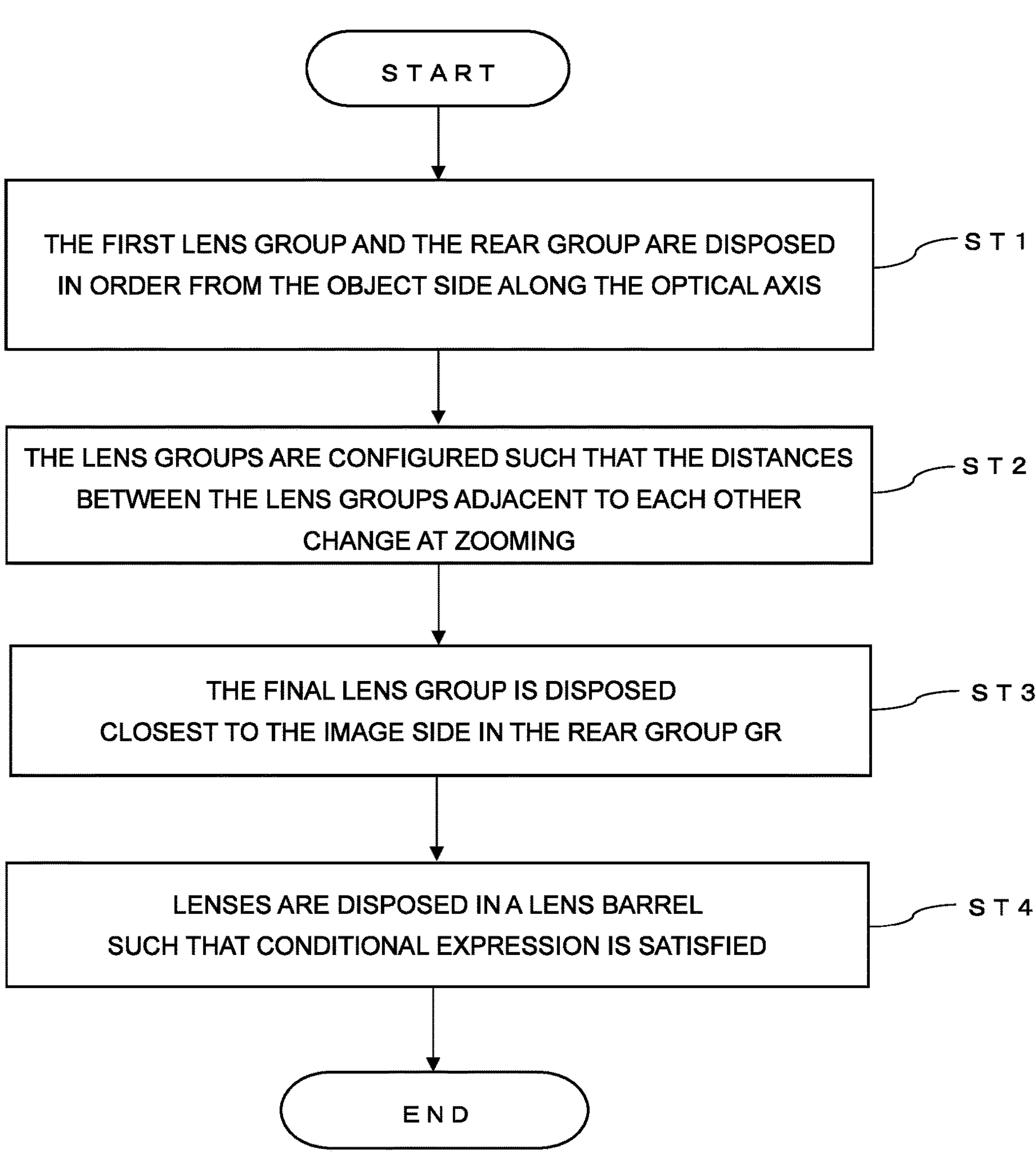
FIG. 12 is a flowchart showing a method for manufacturing a zoom optical system according to a first embodiment.

An outline of a method for manufacturing of the zoom optical system ZL according to the first embodiment will be described below with reference to FIG. 12. First, the first lens group G1 having negative refractive power and the rear group GR including at least one lens group are disposed in order from the object side along the optical axis (step ST1). Subsequently, the lens groups are configured such that the distances between the lens groups adjacent to each other change at zooming (step ST2). Subsequently, the final lens group GE having positive refractive power in the at least one lens group in the rear group GR is disposed closest to the image side in the rear group GR (step ST3). Then, lenses are disposed in a lens barrel such that at least Conditional Expression (1) described above is satisfied (step ST4). According to such a method for manufacturing, it is possible to manufacture a zoom optical system having a small size and favorable optical performance.

Figure 13:
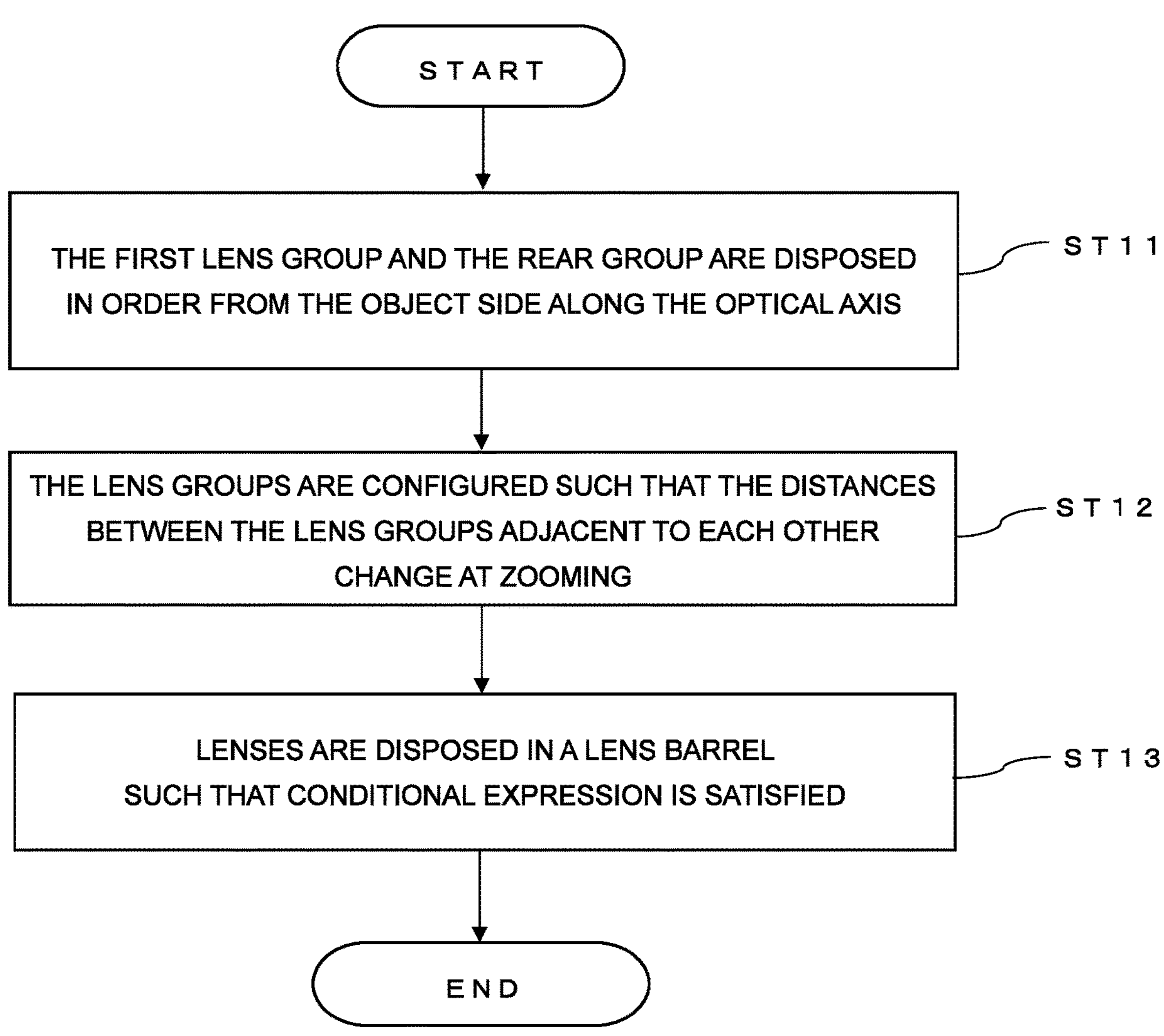
FIG. 13 is a flowchart showing a method for manufacturing a zoom optical system according to a second embodiment.

An outline of a method for manufacturing the zoom optical system ZL according to the second embodiment will be described below with reference to FIG. 13. First, the first lens group G1 having negative refractive power and the rear group GR including at least one lens group are disposed in order from the object side along the optical axis (step ST11). Subsequently, the lens groups are configured such that the distances between the lens groups adjacent to each other change at zooming (step ST12). Then, lenses are disposed in a lens barrel such that at least Conditional Expressions (2) and (3) described above are satisfied (step ST13). According to such a method for manufacturing, it is possible to manufacture a zoom optical system having a small size and favorable optical performance.

EXAMPLES

The zoom optical system ZL according to an example of each embodiment will be described below with reference to the accompanying drawings. FIGS. 1, 3, 5, 7, and 9 are cross-sectional views showing the configurations and refractive power distributions of zoom optical systems according to first to fifth examples ZL {ZL(1) to ZL(5)}. Is the cross-sectional views of the zoom optical systems according to the first to fifth examples ZL(1) to ZL(5), the moving direction of the focusing group along the optical axis upon focusing on from an infinite distance object to a close distance object is shown with an arrow denoted by "focusing". In the cross-sectional views of the zoom optical systems ZL(1) to ZL (5) according to the first to fifth examples, the moving direction of each lens group along the optical axis upon zooming from the wide-angle end state (W) to the telephoto end state (T) is shown with an arrow.

In FIGS. 1, 3, 5, 7, and 9, each lens group is denoted by a combination of a reference sign "G" and a number, and each lens is denoted by a combination of a reference sign "L" and a number. In this case, each lens group or the like is denoted by using a combination of a reference sign and a number independently for each example to prevent complication due to increase in the kinds and magnitudes of reference signs and numbers. Accordingly, the same combination of a reference sign and a number in the examples does not necessarily mean identical components.

Among Tables 1 to 5 below, Table 1 is a table listing various data in the first example, Table 2 is a table listing various data in the second example, Table 3 is a table listing various data in the third example, Table 4 is a table listing various data in the fourth example, and Table 5 is a table listing various data in the fifth example. In each example, aberration characteristics are calculated for the d-line (wavelength $\lambda$=587.6 nm) and the g-line (wavelength $\lambda$=435.8 nm).

In each table of [General Data], f represents the focal length of the entire lens system, FNO represents the F number, $2\omega$ represents the angle of view (in the unit of ° (degrees); $\omega$ represents the half angle of view), and Ymax represents the maximum image height. In addition, TL represents a distance as the sum of BF and the distance from a frontmost lens surface to a final lens surface on the optical axis upon focusing on infinity, and BF represents the distance (back focus) from the final lens surface to the image surface I on the optical axis upon focusing on infinity. Note that these values are listed for each of the zooming states of the wide-angle end (W) and the telephoto end (T).

In each table of [General Data], the value of IHW represents the maximum image height of the zoom optical system in the wide-angle end state. The value of YLE1 represents the effective radius of the object-side lens surface of the lens (final lens) disposed closest to the image side in the zoom optical system. The value of fRw represents the focal length of the rear group in the wide-angle end state. The value of D1 represents the thickness of the first lens group on the optical axis.

In each table of [Lens Data], a surface number represents the order of an optical surface from the object side in a direction in which a light beam proceeds, R represents the radius of curvature (defined to have a positive value for a surface having a curvature center positioned on the image side) of an optical surface, D represents a surface distance that is the distance on the optical axis from an optical surface to the next optical surface (or the image surface), nd represents the refractive index of the material of an optical member at the d-line, vd represents the Abbe number of the material of an optical member with reference to the d-line, and ED represents the effective diameter of an optical surface. The symbol "∞" for the radius of curvature indicates a flat surface or an opening, and "(aperture stop S)" represents an aperture stop S. Notation of the refractive index nd of air=1.00000 is omitted. When an optical surface is aspherical, the symbol "*" is attached to the surface number, and the paraxial radius of curvature is listed in the column of the radius R of curvature.

In each table of [Aspherical surface data], the shape of each aspherical surface listed in [Lens data] is expressed by Expression (A) below. Where, X(y) represents a distance (sag amount) in the optical axis direction from a tangent plane at the apex of the aspherical surface to a position on the aspherical surface at a height y, R represents the radius of curvature (paraxial radius of curvature) of a reference spherical surface, K represents a conic constant, and Ai represents the i-th order aspherical coefficient. The notation "E-n" represents "$\times 10^{-n}$". For example, 1.234E-05 represents $1.234\times 10^{-5}$. Note that the secondary aspherical coefficient A2 is zero, and notation thereof is omitted.

$$X(y) = (y^2/R)/\{1 + (1 - \kappa \times y^2/R^2)^{1/2}\} + A4\times y^4 + A6\times y^6 + A8\times y^8 + A10\times y^{10} \quad \text{(A)}$$

Each table of [Variable distance data] lists surface distance for a surface number i of the surface distance "Di" in the table of [Lens data]. Each table of [Variable Distance Data] lists the surface distance upon focusing on infinity, the surface distance upon focusing on an intermediate distance object, and the surface distance upon focusing on a close distance object state.

Each table of [Lens Group Data] lists the starting surface (surface closest to the object side) and focal length of each lens group.

Unless otherwise stated, the unit "mm" is typically used for all data values such as the focal length f, the radius R of curvature, the surface distance D, and other lengths listed in the tables below, but each optical system can obtain equivalent optical performance when proportionally scaled up or down, and thus the values are not limited to the unit.

The above description of the tables is common to all examples, and any duplicate description is omitted below.

First Example

The first example will be described below with reference to FIGS. 1 and 2 and Table 1. FIG. 1 is a diagram showing a lens configuration of the zoom optical system according to the first example. The zoom optical system ZL(1) according to the first example comprises a first lens group G1 having negative refractive power, an aperture stop S, a second lens group G2 having positive refractive power, a third lens group G3 having negative refractive power, and a fourth lens group G4 having positive refractive power, the lens groups being arranged in order from the object side along the optical axis. Upon zooming from the wide-angle end state (W) to the telephoto end state (T), the second lens group G2, the third lens group G3, and the fourth lens group G4 move to the object side along the optical axis, and the distances between the lens groups adjacent to each other change. Upon zooming, the aperture stop S moves along the optical axis together with the second lens group G2, and the position of the first lens group G1 is fixed relative to the image surface I. Each sign (+) or (–) attached to the reference sign of a lens group represents the refractive power of the lens group, and this notation applies to all examples below as well.

The first lens group G1 includes a biconcave negative lens L11 and a positive meniscus lens L12 having a convex surface on the object side, the lenses being arranged in order from the object side along the optical axis. The negative lens L11 has aspherical lens surfaces on both sides.

The second lens group G2 includes a biconvex positive lens L21, a positive meniscus lens L22 having a convex surface on the object side, and a cemented lens formed by cementing a positive meniscus lens L23 having a concave surface toward the object side and a negative meniscus lens L24 having a concave surface toward the object side, the lenses being arranged in order from the object side along the optical axis. The positive meniscus lens L22 has aspherical lens surfaces on both sides. The negative meniscus lens L24 has an aspherical lens surface on the image side.

The third lens group G3 includes a negative meniscus lens L31 having a concave surface toward the object side. The negative meniscus lens L31 has aspherical lens surfaces on both sides.

The fourth lens group G4 includes a biconvex positive lens L41. The image surface I is disposed on the image side of the fourth lens group G4.

In the present example, the second lens group G2, the third lens group G3, and the fourth lens group G4 serve as the rear group GR having positive refractive power as a whole. The fourth lens group G4 corresponds to the final lens group GE disposed closest to the image side in the rear group GR. The positive lens L41 in the fourth lens group G4 corresponds to the final lens. Upon focusing on from an infinite distance object to a close distance object, the third lens group G3 moves to the image side along the optical axis.

Table 1 below lists data values of the zoom optical system according to the first example. Note that the fifth surface is a virtual surface.

TABLE 1

[General Data]

Zooming ratio = 1.272
IHw = 19.629 YLE1 = 14.900
fRw = 17.133 D1 = 6.256

| | W | T |
|---|---|---|
| f | 18.400 | 23.400 |
| FNO | 5.720 | 5.720 |
| 2ω | 100.18 | 85.74 |
| Ymax | 19.629 | 21.050 |
| TL | 49.452 | 49.452 |
| Bf | 8.581 | 13.436 |

[Lens Data]

| Surface Number | R | D | nd | νd | ED |
|---|---|---|---|---|---|
| 1* | −357.725 | 1.200 | 1.693430 | 53.30 | |
| 2* | 6.954 | 2.756 | | | |
| 3 | 12.294 | 2.300 | 1.900430 | 37.38 | |
| 4 | 28.572 | (D4) | | | |
| 5 | ∞ | 1.000 | | | |
| 6 | ∞ | 0.700 | | | (Aperture Stop S) |
| 7 | 7.133 | 2.598 | 1.497000 | 81.61 | |
| 8 | −41.896 | 0.221 | | | |
| 9* | 12.222 | 1.449 | 1.531100 | 55.91 | |
| 10* | 12.544 | 0.852 | | | |
| 11 | −32.130 | 2.220 | 1.497000 | 81.61 | |
| 12 | −6.730 | 0.900 | 1.860999 | 37.10 | |
| 13* | −21.076 | (D13) | | | |
| 14* | −10.583 | 1.200 | 1.882020 | 37.23 | |
| 15* | −14.489 | (D15) | | | |
| 16 | 111.344 | 3.056 | 1.953750 | 32.33 | 29.810 |
| 17 | −162.063 | Bf | | | 30.550 |

[Aspherical Surface Data]

1st Surface

κ = 2.000, A4 = 1.5424E−06, A6 = −8.3988E−08,
A8 = −3.0649E−10, A10 = 4.4239E−12

2nd Surface

κ = 0.636, A4 = −6.4400E−05, A6 = −8.2111E−07,
A8 = −7.4721E−09, A10 = −4.0071E−10

9th Surface

κ = 1.000, A4 = −1.7502E−04, A6 = −4.9201E−07,
A8 = 5.4360E−07, A10 = −4.5297E−11

10th Surface

κ = 1.000, A4 = −2.7091E−04, A6 = 3.9890E−08,
A8 = 4.1729E−07, A10 = 4.0626E−08

13th Surface

κ = 1.000, A4 = 4.6801E−04, A6 = 1.0244E−05,
A8 = 1.2203E−07, A10 = −1.5857E−10

14th Surface

κ = 0.986, A4 = 3.5436E−04, A6 = −2.4094E−06,
A8 = 7.1549E−09, A10 = −6.6462E−11

15th Surface

κ = 0.854, A4 = 3.2250E−04, A6 = −1.9429E−06,
A8 = 7.6924E−10, A10 = 1.5871E−11

[Variable Distance Data]

| | W | M | T |
|---|---|---|---|
| Upon focusing on infinity | | | |
| Focal length | 18.400 | 20.000 | 23.400 |
| Distance | ∞ | ∞ | ∞ |
| D4 | 8.153 | 6.692 | 3.985 |
| D13 | 7.266 | 6.981 | 7.067 |
| D15 | 5.000 | 5.263 | 4.512 |
| Bf | 8.581 | 10.063 | 13.436 |
| Upon focusing on an intermediate distance object | | | |
| Magnification | −0.025 | −0.025 | −0.025 |
| Distance | 730.527 | 795.834 | 934.488 |
| D4 | 8.153 | 6.692 | 3.985 |
| D13 | 7.978 | 7.693 | 7.823 |
| D15 | 4.289 | 4.552 | 3.756 |
| Bf | 8.581 | 10.063 | 13.436 |
| Upon focusing on a very short distance object | | | |
| Magnification | −0.052 | −0.056 | −0.067 |
| Distance | 350.002 | 350.003 | 350.003 |
| D4 | 8.153 | 6.692 | 3.985 |
| D13 | 8.775 | 8.631 | 9.142 |
| D15 | 3.491 | 3.614 | 2.437 |
| Bf | 8.581 | 10.063 | 13.436 |

[Lens Group Data]

| Group | First surface | Focal length |
|---|---|---|
| G1 | 1 | −20.575 |
| G2 | 7 | 14.938 |
| G3 | 14 | −52.001 |
| G4 | 16 | 69.580 |

Figure 2A:
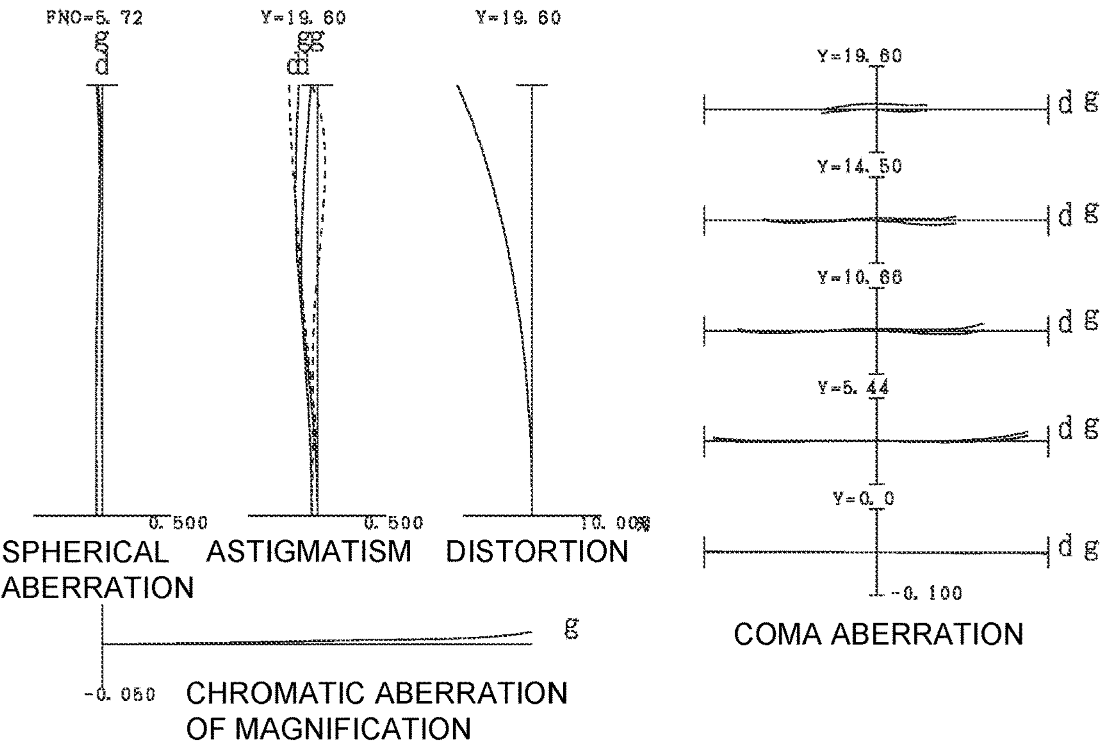
FIGS. 2A and 2B show a variety of aberration diagrams of the zoom optical system according to the first example upon focusing on infinity in a wide-angle end state and a telephoto end state, respectively.
Figure 2B:
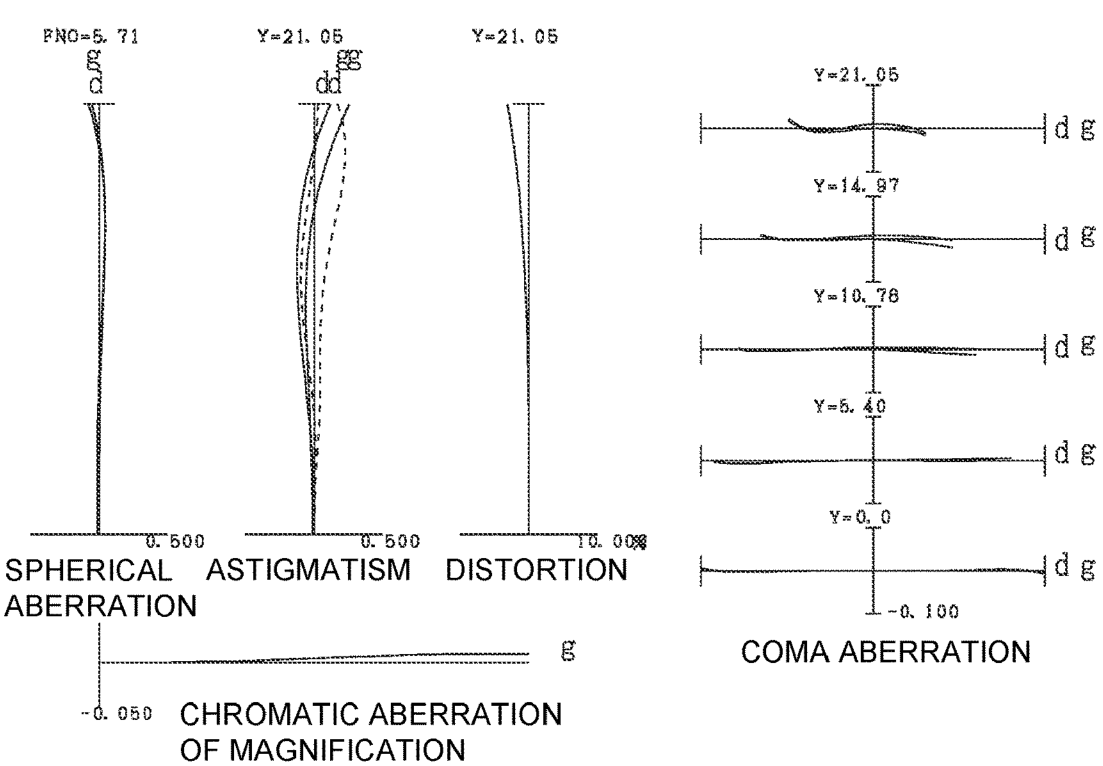

FIG. 2A shows a variety of aberration diagrams of the zoom optical system according to the first example upon focusing on infinity in the wide-angle end state. FIG. 2B shows a variety of aberration diagrams of the zoom optical system according to the first example upon focusing on infinity in the telephoto end state. In each aberration diagram, FNO represents the F-number, and Y represents the image height. Note that each spherical aberration diagram indicates the value of the F-number corresponding to the maximum diameter, each astigmatism diagram and each distortion diagram indicate the maximum value of the image height, and each coma aberration diagram indicates values of the image height. In the diagrams, d represents the d-line (wavelength λ=587.6 nm), and g represents the g-line (wavelength λ=435.8 nm). In each astigmatism diagram, a solid line represents a sagittal image surface, and a dashed line represents a meridional image surface. Note that the same reference signs as in the present example are also used in the aberration diagrams of each example described below, and duplicate description thereof is omitted.

From the variety of aberration diagrams, it can be understood that the zoom optical system according to the first example has a variety of aberrations excellently corrected in both the wide-angle end state and the telephoto end state and has excellent imaging performance.

Second Example

Figure 3:
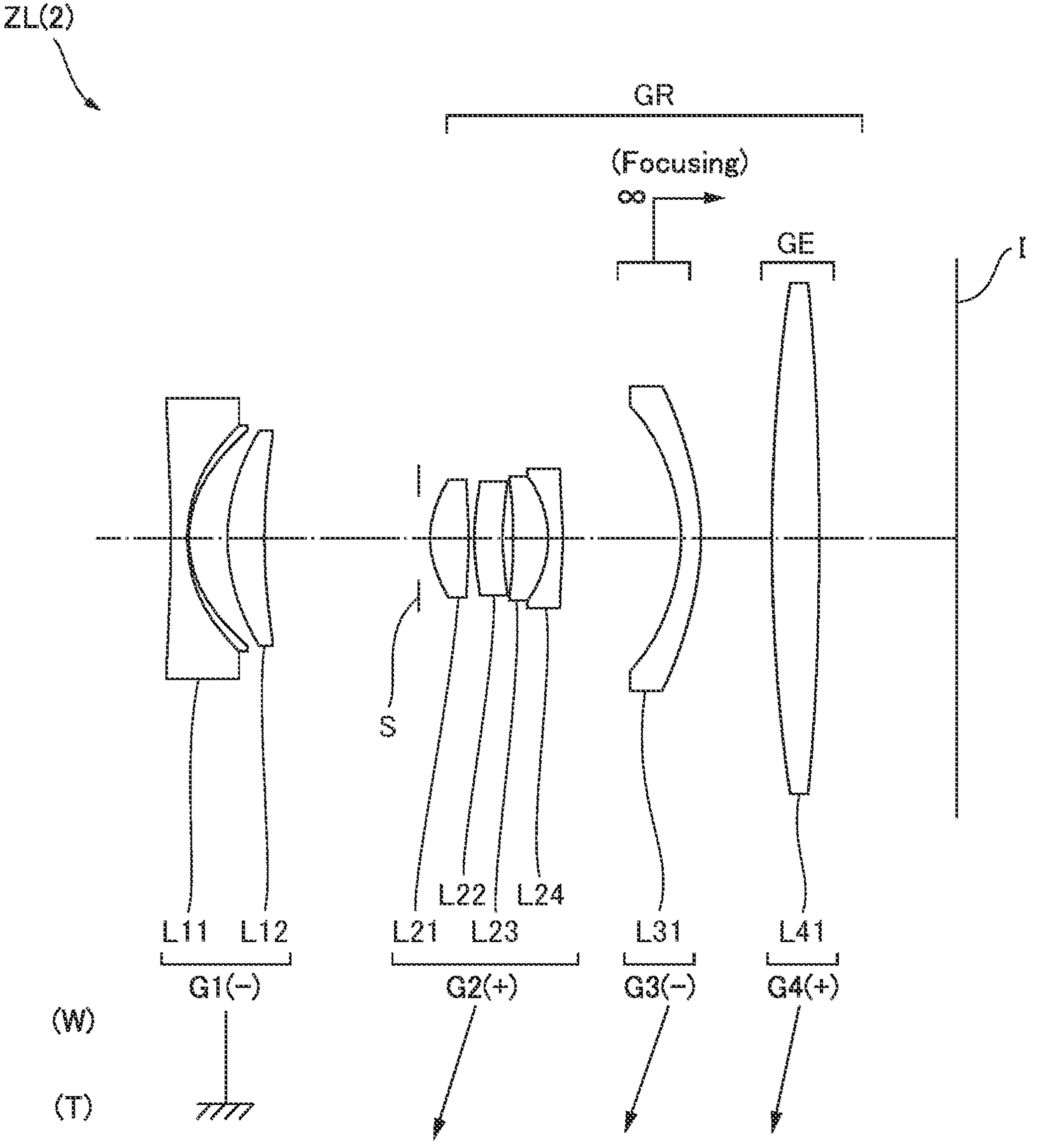
FIG. 3 is a diagram showing a lens configuration of a zoom optical system according to a second example.

The second example will be described below with reference to FIGS. 3 and 4 and Table 2. FIG. 3 is a diagram showing a lens configuration of the zoom optical system according to the second example. The zoom optical system ZL(2) according to the second example comprises a first lens group G1 having negative refractive power, an aperture stop S, a second lens group G2 having positive refractive power, a third lens group G3 having negative refractive power, and a fourth lens group G4 having positive refractive power, the lens groups being arranged in order from the object side along the optical axis. Upon zooming from the wide-angle end state (W) to the telephoto end state (T), the second lens group G2, the third lens group G3, and the fourth lens group G4 move to the object side along the optical axis, and the distances between the lens groups adjacent to each other change. Upon zooming, the aperture stop S moves along the optical axis together with the second lens group G2, and the position of the first lens group G1 is fixed relative to the image surface I.

The first lens group G1 includes a biconcave negative lens L11 and a positive meniscus lens L12 having a convex surface on the object side, the lenses being arranged in order from the object side along the optical axis. The negative lens L11 is a hybrid lens provided with a resin layer on a surface of a glass lens body on the image side. The resin layer has an aspherical surface on the image side, and the negative lens L11 is a compound aspherical lens. In [Lens Data] to be described later, surface number 1 corresponds to the object-side surface of the lens body, surface number 2 corresponds to the image-side surface of the lens body and the object-side surface of the resin layer (surface at which both members are cemented), and surface number 3 corresponds to the image-side surface of the resin layer.

The second lens group G2 includes a biconvex positive lens L21, a positive meniscus lens L22 having a convex surface on the object side, and a cemented lens formed by cementing a positive meniscus lens L23 having a concave surface toward the object side and a negative meniscus lens L24 having a concave surface toward the object side, the lenses being arranged in order from the object side along the optical axis. The positive meniscus lens L22 has aspherical lens surfaces on both sides. The negative meniscus lens L24 has an aspherical lens surface on the image side.

The third lens group G3 includes a negative meniscus lens L31 having a concave surface toward the object side. The negative meniscus lens L31 has aspherical lens surfaces on both sides.

The fourth lens group G4 includes a biconvex positive lens L41. The image surface I is disposed on the image side of the fourth lens group G4.

In the present example, the second lens group G2, the third lens group G3, and the fourth lens group G4 serve as the rear group GR having positive refractive power as a whole. The fourth lens group G4 corresponds to the final lens group GE disposed closest to the image side in the rear group GR. The positive lens L41 in the fourth lens group G4 corresponds to the final lens. Upon focusing on from an infinite distance object to a close distance object, the third lens group G3 moves to the image side along the optical axis.

Table 2 below lists data values of the zoom optical system according to the second example. Note that the sixth surface is a virtual surface.

TABLE 2

[General Data]

Zooming ratio = 1.272

| | |
|---|---|
| IHw = 19.683 | YLE1 = 14.870 |
| fRw = 17.483 | D1 = 3.588 |

| | W | T |
|---|---|---|
| f | 18.400 | 23.400 |
| FNO | 5.713 | 5.705 |
| 2ω | 98.96 | 85.62 |
| Ymax | 19.683 | 21.120 |
| TL | 49.358 | 49.358 |
| Bf | 8.579 | 12.361 |

TABLE 2-continued

[Lens Data]

| Surface Number | R | D | nd | νd | ED |
|---|---|---|---|---|---|
| 1 | −129.182 | 1.000 | 1.741000 | 52.76 | |
| 2 | 9.532 | 0.050 | 1.560930 | 36.64 | |
| 3* | 6.858 | 2.538 | | | |
| 4 | 13.334 | 2.300 | 1.902650 | 35.72 | |
| 5 | 47.321 | (D5) | | | |
| 6 | ∞ | 1.000 | | | |
| 7 | ∞ | 0.700 | | | (Aperture Stop S) |
| 8 | 6.988 | 2.376 | 1.496997 | 81.61 | |
| 9 | −53.107 | 0.374 | | | |
| 10* | 15.475 | 1.767 | 1.531131 | 55.75 | |
| 11* | 16.211 | 0.690 | | | |
| 12 | −29.593 | 2.194 | 1.496997 | 81.61 | |
| 13 | −6.685 | 0.900 | 1.882023 | 37.22 | |
| 14* | −20.145 | (D14) | | | |
| 15* | −10.562 | 1.200 | 1.882023 | 37.22 | |
| 16* | −14.452 | (D16) | | | |
| 17 | 113.759 | 3.010 | 1.953750 | 32.33 | 29.730 |
| 18 | −168.330 | Bf | | | 30.470 |

[Aspherical Surface Data]

3rd Surface

κ = 0.481, A4 = −1.0183E−04, A6 = −1.2459E−06, A8 = 3.6115E−09, A10 = −1.9727E−10

10th Surface

κ = 1.000, A4 = −3.4705E−04, A6 = 1.3896E−06, A8 = −2.7121E−08, A10 = 2.4890E−08

11th Surface

κ = 1.000, A4 = −6.4815E−04, A6 = −6.7139E−06, A8 = 9.0303E−08, A10 = 5.7656E−08

14th Surface

κ = 1.000, A4 = 5.7814E−04, A6 = 1.3551E−05, A8 = 2.3393E−07, A10 = −5.2514E−09

15th Surface

κ = 0.741, A4 = 3.4284E−04, A6 = −2.9692E−06, A8 = 9.9964E−09, A10 = −1.3394E−10

16th Surface

κ = 1.217, A4 = 3.4208E−04, A6 = −2.1674E−06, A8 = 1.4380E−09, A10 = 2.0020E−11

[Variable Distance Data]

| | W | M | T |
|---|---|---|---|
| Upon focusing on infinity | | | |
| Focal length | 18.400 | 20.000 | 23.400 |
| Distance | ∞ | ∞ | ∞ |
| D5 | 8.735 | 7.230 | 4.467 |
| D14 | 7.509 | 6.994 | 7.015 |
| D16 | 4.438 | 5.034 | 5.418 |
| Bf | 8.579 | 10.003 | 12.361 |
| Upon focusing on an intermediate distance object | | | |
| Magnification | −0.025 | −0.025 | −0.025 |
| Distance | 730.410 | 795.845 | 934.378 |
| D5 | 8.735 | 7.230 | 4.467 |
| D14 | 8.242 | 7.713 | 7.763 |
| D16 | 3.705 | 4.315 | 4.670 |
| Bf | 8.579 | 10.003 | 12.361 |
| Upon focusing on a very short distance object | | | |
| Magnification | −0.052 | −0.056 | −0.066 |
| Distance | 350.097 | 350.096 | 350.097 |
| D5 | 8.735 | 7.230 | 4.467 |
| D14 | 9.066 | 8.661 | 9.071 |
| D16 | 2.881 | 3.367 | 3.362 |
| Bf | 8.579 | 10.003 | 12.361 |

TABLE 2-continued

| [Lens Group Data] | | |
|---|---|---|
| Group | First surface | Focal length |
| G1 | 1 | −22.079 |
| G2 | 8 | 15.408 |
| G3 | 15 | −52.012 |
| G4 | 17 | 71.547 |

Figure 4A:
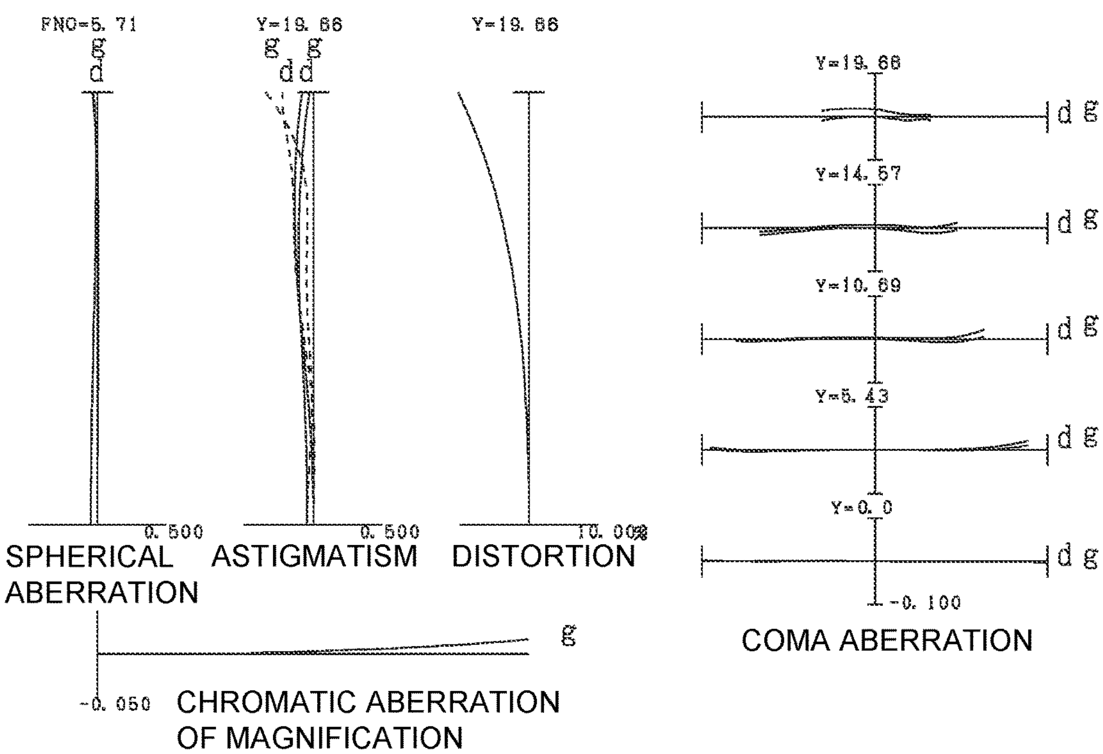
FIGS. 4A and 4B show a variety of aberration diagrams of the zoom optical system according to the second example upon focusing on infinity in a wide-angle end state and a telephoto end state, respectively.
Figure 4B:
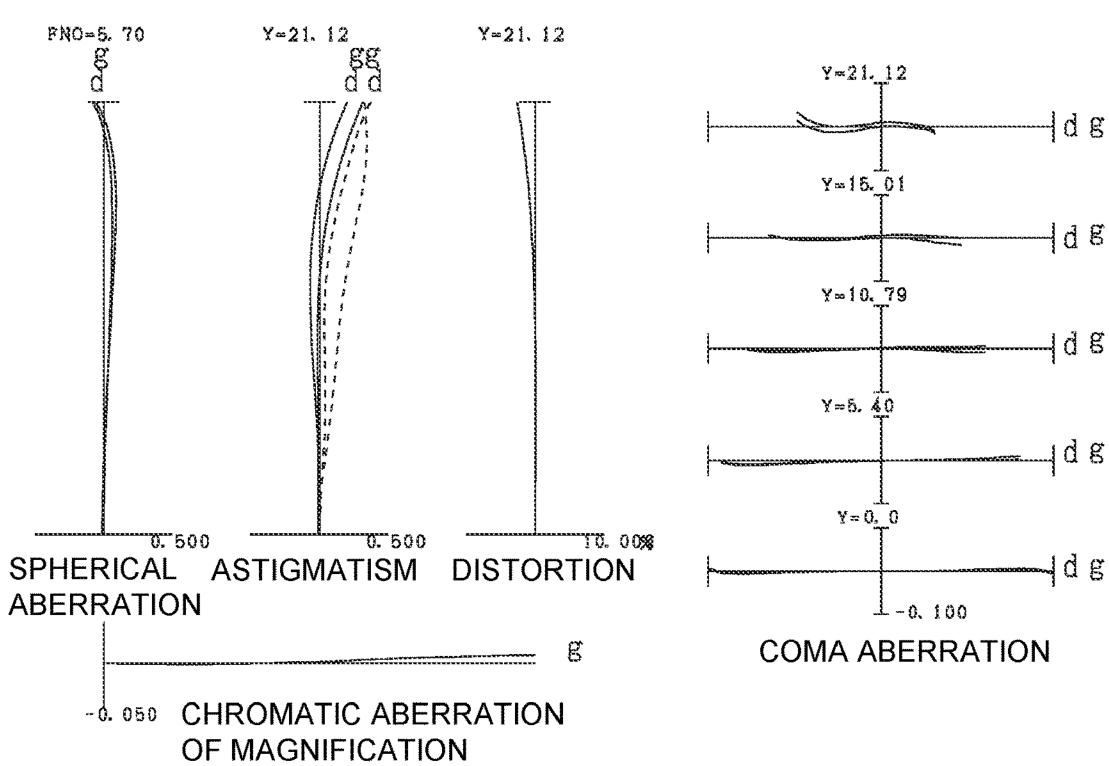

FIG. 4A shows a variety of aberration diagrams of the zoom optical system according to the second example upon focusing on infinity in the wide-angle end state. FIG. 4B shows a variety of aberration diagrams of the zoom optical system according to the second example upon focusing on infinity in the telephoto end state. From the variety of aberration diagrams, it can be understood that the zoom optical system according to the second example has a variety of aberrations excellently corrected in both the wide-angle end state and the telephoto end state and has excellent imaging performance.

Third Example

Figure 5:
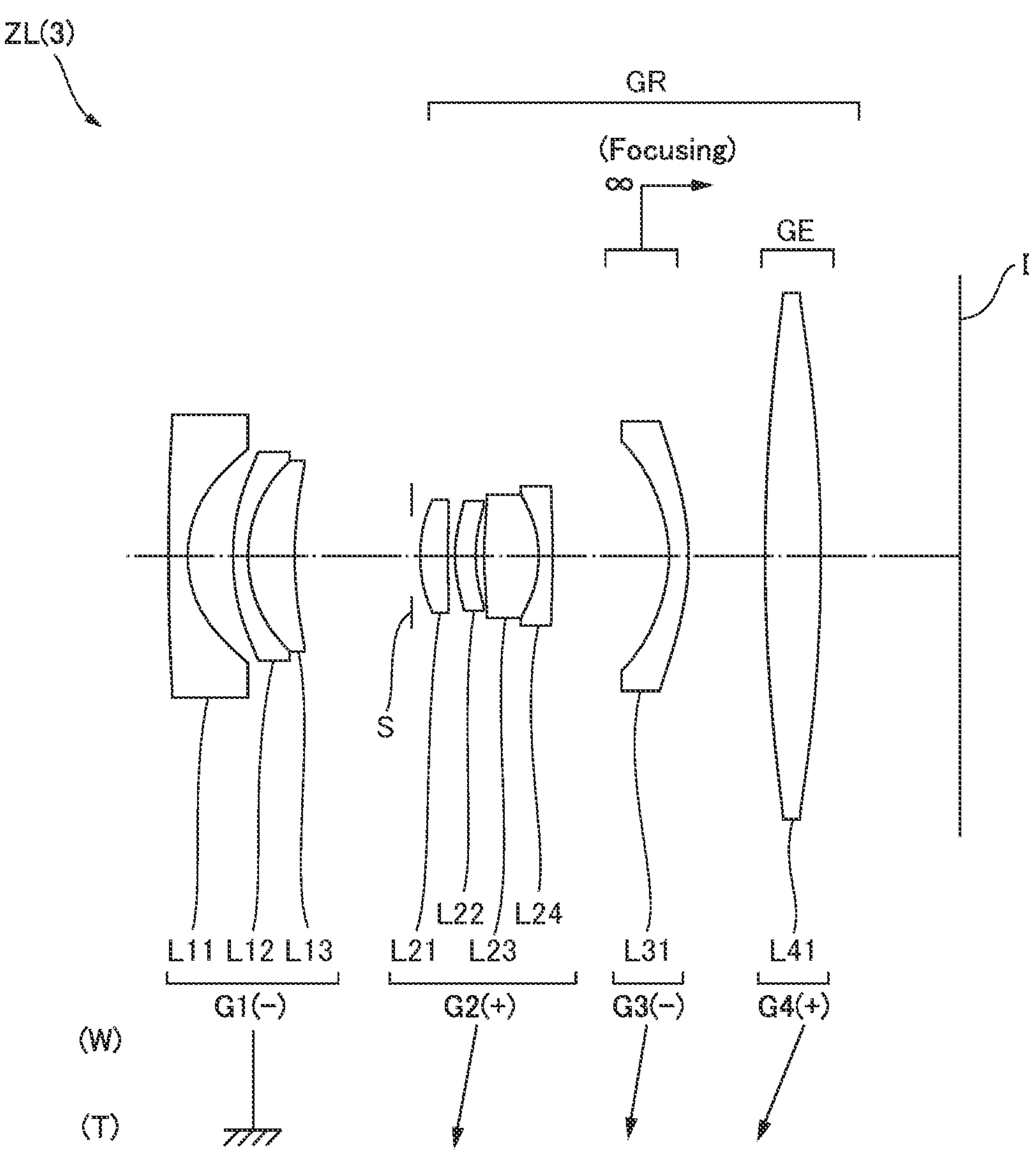
FIG. 5 is a diagram showing a lens configuration of a zoom optical system according to a third example.

The third example will be described below with reference to FIGS. 5 and 6 and Table 3. FIG. 5 is a diagram showing a lens configuration of the zoom optical system according to the third example. The zoom optical system ZL(3) according to the third example comprises a first lens group G1 having negative refractive power, an aperture stop S, a second lens group G2 having positive refractive power, a third lens group G3 having negative refractive power, and a fourth lens group G4 having positive refractive power, the lens groups being arranged in order from the object side along the optical axis. Upon zooming from the wide-angle end state (W) to the telephoto end state (T), the second lens group G2, the third lens group G3, and the fourth lens group G4 move to the object side along the optical axis, and the distances between the lens groups adjacent to each other change. Upon zooming, the aperture stop S moves along the optical axis together with the second lens group G2, and the position of the first lens group G1 is fixed relative to the image surface I.

The first lens group G1 includes a negative meniscus lens L11 having a convex surface on the object side, and a cemented lens formed by cementing a negative meniscus lens L12 having a convex surface on the object side and a positive meniscus lens L13 having a convex surface on the object side, the lenses being arranged in order from the object side along the optical axis. The negative meniscus lens L11 has aspherical lens surfaces on both sides.

The second lens group G2 includes a positive meniscus lens L21 having a convex surface on the object side, a positive meniscus lens L22 having a convex surface on the object side, and a cemented lens formed by cementing a biconvex positive lens L23 and a negative meniscus lens L24 having a concave surface toward the object side, the lenses being arranged in order from the object side along the optical axis. The negative meniscus lens L24 has an aspherical lens surface on the image side.

The third lens group G3 includes a negative meniscus lens L31 having a concave surface toward the object side. The negative meniscus lens L31 has aspherical lens surfaces on both sides.

The fourth lens group G4 includes a biconvex positive lens L41. The image surface I is disposed on the image side of the fourth lens group G4.

In the present example, the second lens group G2, the third lens group G3, and the fourth lens group G4 serve as the rear group GR having positive refractive power as a whole. The fourth lens group G4 corresponds to the final lens group GE disposed closest to the image side in the rear group GR. The positive lens L41 in the fourth lens group G4 corresponds to the final lens. Upon focusing on from an infinite distance object to a close distance object, the third lens group G3 moves to the image side along the optical axis.

Table 3 below lists data values of the zoom optical system according to the third example. Note that the sixth surface is a virtual surface.

TABLE 3

[General Data]

Zooming ratio = 1.272

| | |
|---|---|
| IHw = 19.477 | YLE1 = 14.420 |
| fRw = 16.595 | D1 = 7.964 |

| | W | T |
|---|---|---|
| f | 18.400 | 23.400 |
| FNO | 5.713 | 5.717 |
| 2ω | 100.44 | 85.97 |
| Ymax | 19.477 | 20.710 |
| TL | 49.532 | 49.532 |
| Bf | 8.647 | 13.482 |

[Lens Data]

| Surface Number | R | D | nd | νd | ED |
|---|---|---|---|---|---|
| 1* | 130.766 | 1.200 | 1.727926 | 49.17 | |
| 2* | 7.203 | 2.864 | | | |
| 3 | 14.601 | 0.900 | 1.497820 | 82.57 | |
| 4 | 8.389 | 3.000 | 1.749341 | 42.57 | |
| 5 | 27.175 | (D5) | | | |
| 6 | ∞ | 0.700 | | | |
| 7 | ∞ | 0.500 | | | (Aperture Stop S) |
| 8 | 8.814 | 1.749 | 1.496997 | 81.61 | |
| 9 | 112.334 | 0.442 | | | |
| 10 | 10.063 | 1.308 | 1.531131 | 55.75 | |
| 11 | 10.297 | 0.500 | | | |
| 12 | 33.074 | 3.477 | 1.496997 | 81.61 | |
| 13 | −7.477 | 0.900 | 1.619518 | 36.33 | |
| 14* | −32.358 | (D14) | | | |
| 15* | −9.518 | 1.200 | 1.882023 | 37.22 | |
| 16* | −15.063 | (D16) | | | |
| 17 | 126.420 | 3.455 | 1.900430 | 37.37 | 28.830 |
| 18 | −100.736 | Bf | | | 29.800 |

[Aspherical Surface Data]

1st Surface

κ = 2.000, A4 = 1.0197E−06, A6 = −8.9402E−08, A8 = −2.7648E−10, A10 = 3.7893E−12

2nd Surface

κ = 1.000, A4 = −2.6735E−05, A6 = −6.0936E−07, A8 = 1.6250E−09, A10 = −4.0421E−10

14th Surface

κ = 1.000, A4 = 3.1906E−04, A6 = 4.8473E−06, A8 = 7.4277E−08, A10 = 3.2640E−09

15th Surface

κ = 1.000, A4 = 2.4482E−04, A6 = −2.4107E−06, A8 = 1.3351E−09, A10 = −4.9608E−12

TABLE 3-continued

| 16th Surface |
|---|
| κ = 1.333, A4 = 2.7878E−04, A6 = −1.9504E−06, A8 = 8.1780E−09, A10 = −8.9157E−12 |

[Variable Distance Data]

| | W | M | T |
|---|---|---|---|
| Upon focusing on infinity | | | |
| Focal length | 18.400 | 20.000 | 23.400 |
| Distance | ∞ | ∞ | ∞ |
| D5 | 6.596 | 5.184 | 2.575 |
| D14 | 7.308 | 7.148 | 7.233 |
| D16 | 4.787 | 4.837 | 4.049 |
| Bf | 8.647 | 10.169 | 13.482 |
| Upon focusing on an intermediate distance object | | | |
| Magnification | −0.026 | −0.026 | −0.026 |
| Distance | 700.012 | 749.998 | 890.028 |
| D5 | 6.596 | 5.184 | 2.575 |
| D14 | 7.760 | 7.609 | 7.712 |
| D16 | 4.335 | 4.376 | 3.570 |
| Bf | 8.647 | 10.169 | 13.482 |
| Upon focusing on a very short distance object | | | |
| Magnification | −0.052 | −0.056 | −0.066 |
| Distance | 350.026 | 350.087 | 350.216 |
| D5 | 6.596 | 5.184 | 2.575 |
| D14 | 8.218 | 8.144 | 8.467 |
| D16 | 3.878 | 3.841 | 2.816 |
| Bf | 8.647 | 10.169 | 13.482 |

[Lens Group Data]

| Group | First surface | Focal length |
|---|---|---|
| G1 | 1 | −20.271 |
| G2 | 8 | 14.114 |
| G3 | 15 | −32.619 |
| G4 | 17 | 62.714 |

Figure 6A:
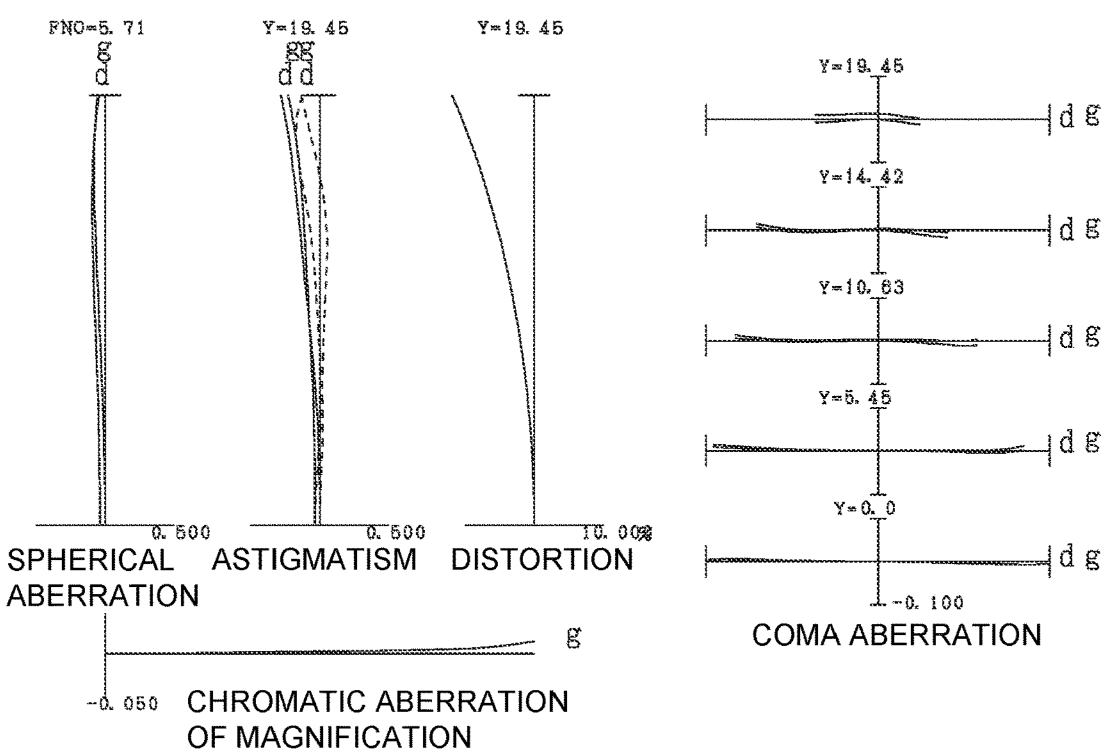
FIGS. 6A and 6B show a variety of aberration diagrams of the zoom optical system according to the third example upon focusing on infinity in a wide-angle end state and a telephoto end state, respectively.
Figure 6B:
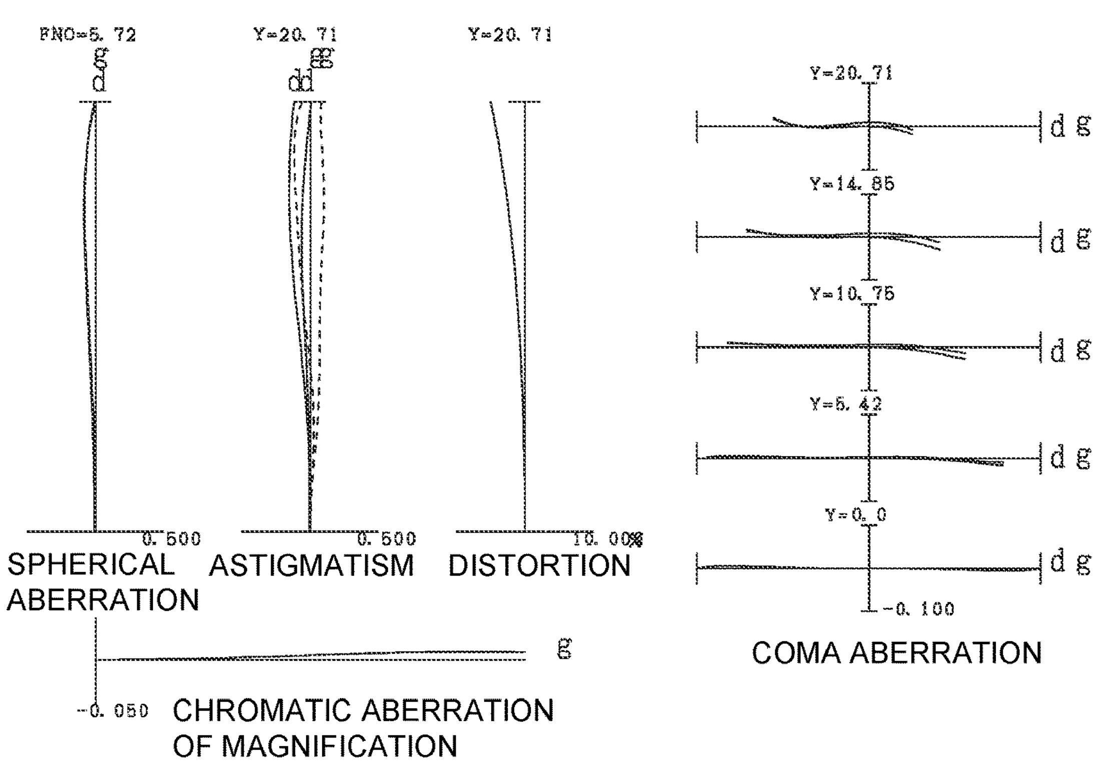

FIG. 6A shows a variety of aberration diagrams of the zoom optical system according to the third example upon focusing on infinity in the wide-angle end state. FIG. 6B shows a variety of aberration diagrams of the zoom optical system according to the third example upon focusing on infinity in the telephoto end state. From the variety of aberration diagrams, it can be understood that the zoom optical system according to the third example has a variety of aberrations excellently corrected in both the wide-angle end state and the telephoto end state and has excellent imaging performance.

Fourth Example

Figure 7:
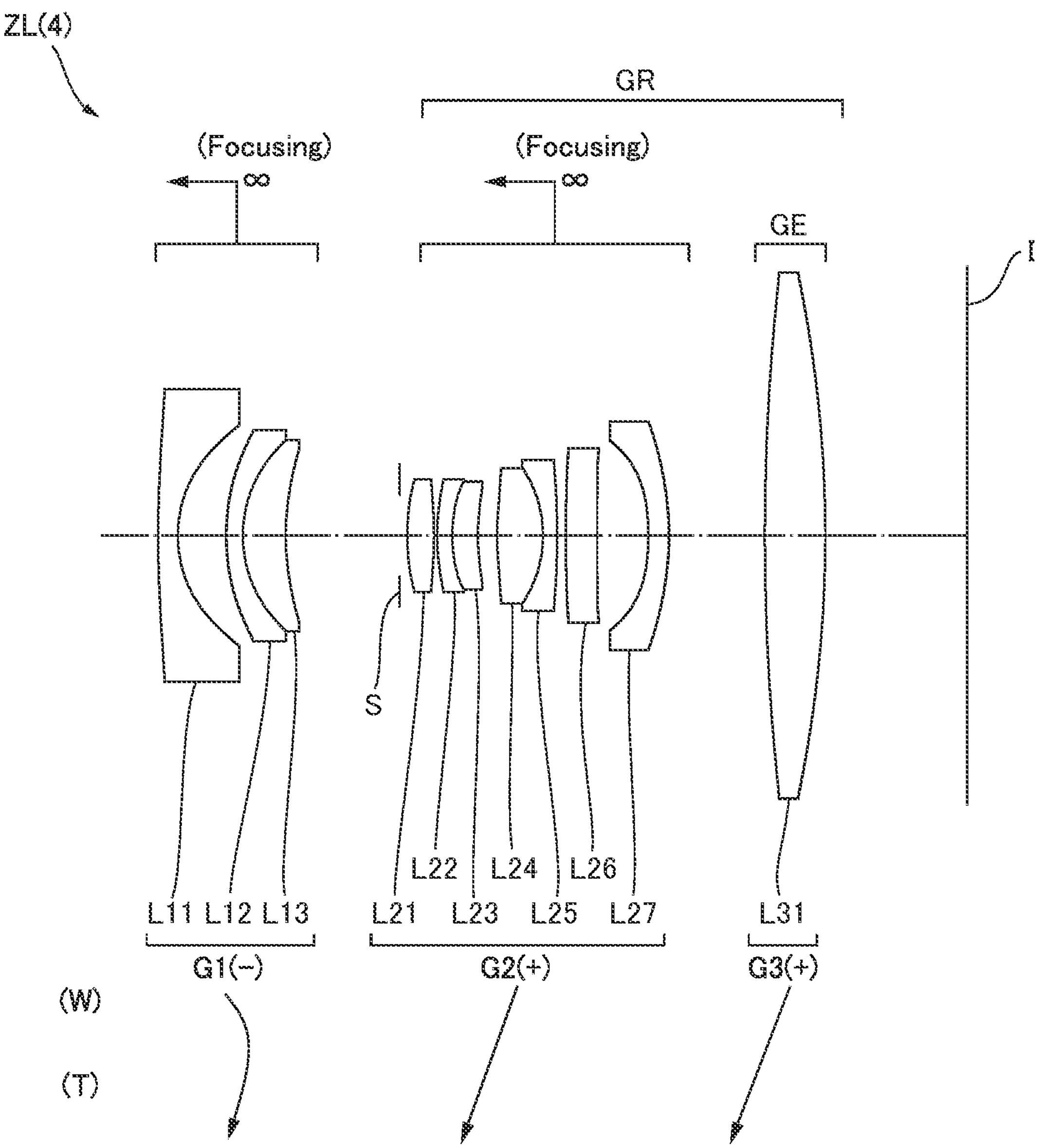
FIG. 7 is a diagram showing a lens configuration of a zoom optical system according to a fourth example.

The fourth example will be described below with reference to FIGS. 7 and 8 and Table 4. FIG. 7 is a diagram showing a lens configuration of the zoom optical system according to the fourth example. The zoom optical system ZL(4) according to the fourth example comprises a first lens group G1 having negative refractive power, an aperture stop S, a second lens group G2 having positive refractive power, and a third lens group G3 having positive refractive power, the lens groups being arranged in order from the object side along the optical axis. Upon zooming from the wide-angle end state (W) to the telephoto end state (T), the first lens group G1 temporarily moves to the image side along the optical axis and then moves to the object side, the second lens group G2 and the third lens group G3 move to the object side along the optical axis, and the distances between the lens groups adjacent to each other change. Upon zooming, the aperture stop S moves along the optical axis together with the second lens group G2.

The first lens group G1 includes a negative meniscus lens L11 having a convex surface on the object side, and a cemented lens formed by cementing a negative meniscus lens L12 having a convex surface on the object side and a positive meniscus lens L13 having a convex surface on the object side, the lenses being arranged in order from the object side along the optical axis. The negative meniscus lens L11 has aspherical lens surfaces on both sides.

The second lens group G2 includes a biconvex positive lens L21, a cemented lens formed by cementing a negative meniscus lens L22 having a convex surface on the object side and a positive meniscus lens L23 having a convex surface on the object side, a cemented lens formed by cementing a biconvex positive lens L24 and a negative meniscus lens L25 having a concave surface toward the object side, a positive meniscus lens L26 having a concave surface toward the object side, and a negative meniscus lens L27 having a concave surface toward the object side, the lenses being arranged in order from the object side along the optical axis. The positive meniscus lens L26 has aspherical lens surfaces on both sides. The negative meniscus lens L27 has aspherical lens surfaces on both sides.

The third lens group G3 includes a biconvex positive lens L31. The image surface I is disposed the image side of the third lens group G3.

In the present example, the second lens group G2 and the third lens group G3 serve as the rear group GR having positive refractive power as a whole. The third lens group G3 corresponds to the final lens group GE disposed closest to the image side in the rear group GR. The positive lens L31 in the third lens group G3 corresponds to the final lens. Upon focusing on from an infinite distance object to a close distance object, the first lens group G1 and the second lens group G2 move to the object side along the optical axis with loci (moving amounts) different from each other.

Table 4 below lists data values of the zoom optical system according to the fourth example.

TABLE 4

[General Data]

| | |
|---|---|
| Zooming ratio = 1.272 | |
| IHw = 19.626 | YLE1 = 14.790 |
| fRw = 16.390 | D1 = 7.881 |

| | W | T |
|---|---|---|
| f | 18.400 | 23.400 |
| FNO | 5.709 | 5.715 |
| 2ω | 100.57 | 95.34 |
| Ymax | 19.626 | 21.600 |
| TL | 49.499 | 49.462 |
| Bf | 8.607 | 12.538 |

[Lens Data]

| Surface Number | R | D | nd | νd | ED |
|---|---|---|---|---|---|
| 1* | 71.036 | 1.200 | 1.693430 | 53.30 | |
| 2* | 7.423 | 3.005 | | | |
| 3 | 13.478 | 1.000 | 1.497820 | 82.57 | |
| 4 | 8.024 | 2.676 | 1.741855 | 43.59 | |
| 5 | 19.000 | (D5) | | | |
| 6 | ∞ | 0.500 | | | (Aperture Stop S) |
| 7 | 15.280 | 1.627 | 1.496997 | 81.61 | |
| 8 | −33.660 | 0.200 | | | |

TABLE 4-continued

| | | | | | |
|---|---|---|---|---|---|
| 9 | 14.812 | 0.900 | 1.850000 | 27.03 | |
| 10 | 8.658 | 1.596 | 1.900430 | 37.37 | |
| 11 | 17.168 | 1.207 | | | |
| 12 | 41.240 | 2.803 | 1.496997 | 81.61 | |
| 13 | −7.645 | 0.900 | 1.587634 | 41.38 | |
| 14 | −37.583 | 0.500 | | | |
| 15* | −447.785 | 1.941 | 1.531131 | 55.75 | |
| 16* | −166.952 | 3.156 | | | |
| 17* | −10.496 | 1.200 | 1.882023 | 37.22 | |
| 18* | −18.856 | (D18) | | | |
| 19 | 162.352 | 3.705 | 1.900430 | 37.37 | 29.570 |
| 20 | −78.975 | Bf | | | 30.540 |

[Aspherical Surface Data]

1st Surface

κ = 2.000, A4 = −5.3759E−06, A6 = −3.2180E−07, A8 = 1.9522E−09, A10 = −3.2146E−12

2nd Surface

κ = 0.692, A4 = 2.4610E−05, A6 = −2.1145E−07, A8 = −1.0420E−08, A10 = −1.1155E−10

15th Surface

κ = 1.000, A4 = 2.4812E−04, A6 = −1.1561E−05, A8 = 6.9825E−07, A10 = −8.7384E−09

16th Surface

κ = 1.000, A4 = 3.2250E−04, A6 = −1.5148E−05, A8 = 3.7657E−07, A10 = −3.0591E−10

17th Surface

κ = 2.000, A4 = 2.4715E−04, A6 = −1.5123E−05, A8 = 1.3715E−07, A10 = −3.6625E−09

18th Surface

κ = 2.000, A4 = 2.5191E−04, A6 = −8.2472E−06, A8 = 1.1360E−07, A10 = −3.9580E−10

[Variable Distance Data]

| | W | M | T |
|---|---|---|---|
| Upon focusing on infinity | | | |
| Focal length | 18.400 | 20.000 | 23.400 |
| Distance | ∞ | ∞ | ∞ |
| D5 | 6.923 | 5.437 | 2.955 |
| D18 | 5.855 | 5.855 | 5.855 |
| Bf | 8.607 | 9.865 | 12.538 |
| Upon focusing on an intermediate distance object | | | |
| Magnification | −0.026 | −0.026 | −0.026 |
| Distance | 699.337 | 749.569 | 889.517 |
| D5 | 7.105 | 5.793 | 3.440 |
| D18 | 6.329 | 6.142 | 5.838 |
| Bf | 8.607 | 9.865 | 12.538 |
| Upon focusing on a very short distance object | | | |
| Magnification | −0.123 | −0.129 | −0.139 |
| Distance | 147.150 | 147.227 | 147.589 |
| D5 | 7.948 | 7.042 | 5.553 |
| D18 | 7.766 | 7.293 | 5.814 |
| Bf | 8.607 | 9.865 | 12.538 |

[Lens Group Data]

| Group | First surface | Focal length |
|---|---|---|
| G1 | 1 | −20.847 |
| G2 | 7 | 15.067 |
| G3 | 19 | 59.438 |

Figure 8A:
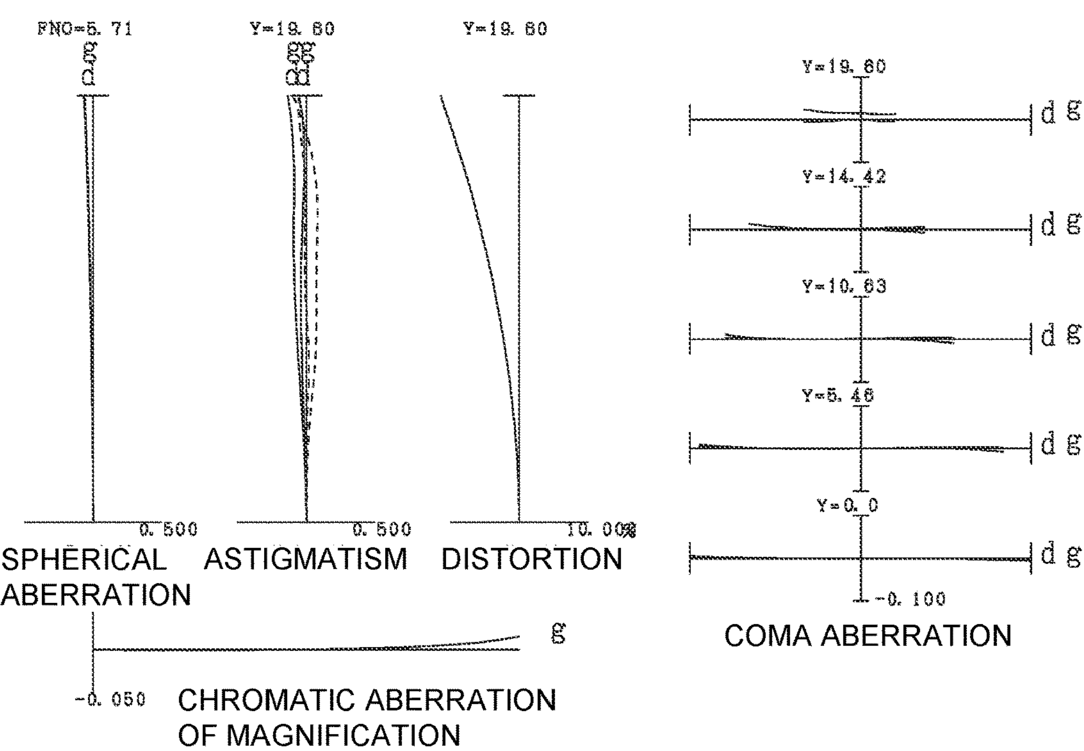
FIGS. 8A and 8B show a variety of aberration diagrams of the zoom optical system according to the fourth example upon focusing on infinity in a wide-angle end state and a telephoto end state, respectively.
Figure 8B:
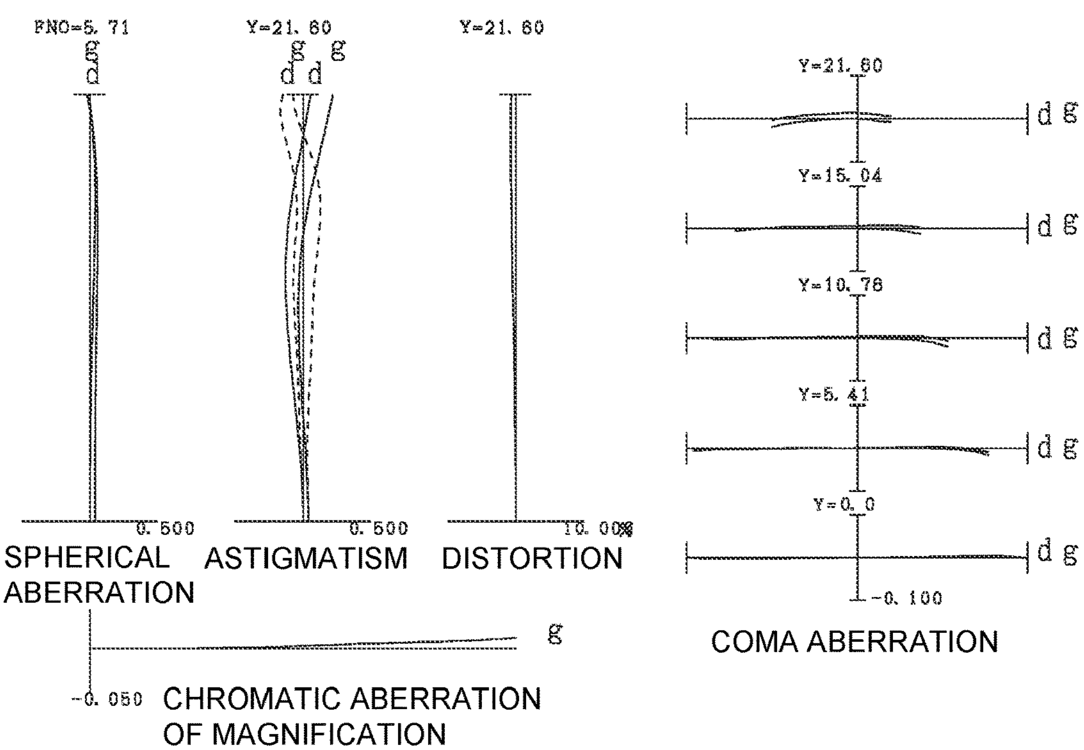

FIG. 8A shows a variety of aberration diagrams of the zoom optical system according to the fourth example upon focusing on infinity in the wide-angle end state. FIG. 8B shows a variety of aberration diagrams of the zoom optical system according to the fourth example upon focusing on infinity in the telephoto end state. From the variety of aberration diagrams, it can be understood that the zoom optical system according to the fourth example has a variety of aberrations excellently corrected in both the wide-angle end state and the telephoto end state and has excellent imaging performance.

Fifth Example

Figure 9:
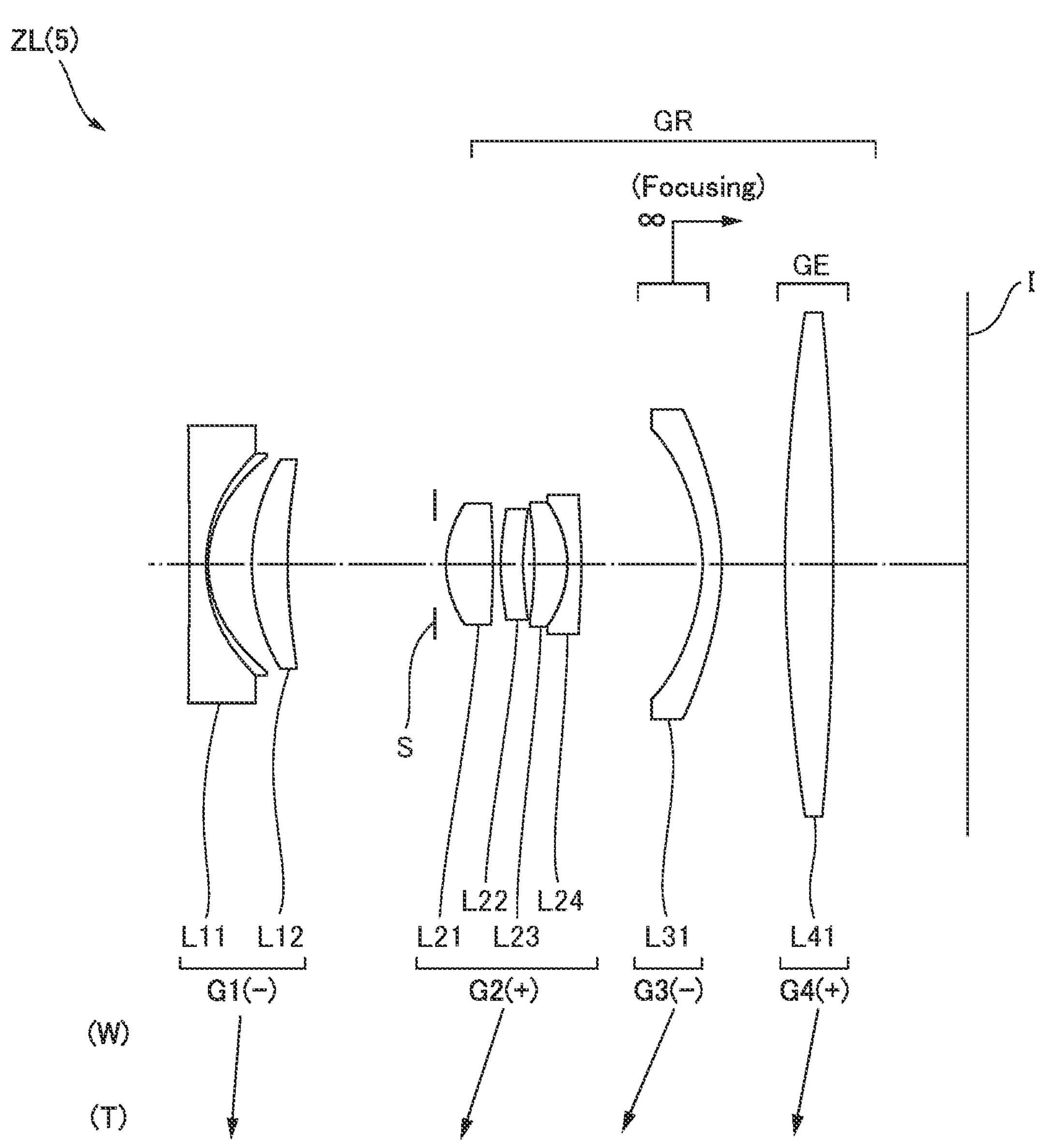
FIG. 9 is a diagram showing a lens configuration of a zoom optical system according to a fifth example.

The fifth example will be described below with reference to FIGS. 9 and 10 and Table 5. FIG. 9 is a diagram showing a lens configuration of the zoom optical system according to the fifth example. The zoom optical system ZL(5) according to the fifth example comprises a first lens group G1 having negative refractive power, an aperture stop S, a second lens group G2 having positive refractive power, a third lens group G3 having negative refractive power, and a fourth lens group G4 having positive refractive power, the lens groups being arranged in order from the object side along the optical axis. Upon zooming from the wide-angle end state (W) to the telephoto end state (T), the first lens group G1, the second lens group G2, the third lens group G3, and the fourth lens group G4 move to the object side along the optical axis, and the distances between the lens groups adjacent to each other change. Upon zooming, the aperture stop S moves along the optical axis together with the second lens group G2.

The first lens group G1 includes a biconcave negative lens L11 and a positive meniscus lens L12 having a convex surface on the object side, the lenses being arranged in order from the object side along the optical axis. The negative lens L11 is a hybrid lens provided with a resin layer on a surface of a glass lens body on the image side. The resin layer has an aspherical surface on the image side, and the negative lens L11 is a compound aspherical lens. In [Lens Data] to be described later, surface number 1 corresponds to the object-side surface of the lens body, surface number 2 corresponds to the image-side surface of the lens body and the object-side surface of the resin layer (surface at which both members are cemented), and surface number 3 corresponds to the image-side surface of the resin layer.

The second lens group G2 includes a biconvex positive lens L21, a positive meniscus lens L22 having a convex surface on the object side, and a cemented lens formed by cementing a positive meniscus lens L23 having a concave surface toward the object side and a negative meniscus lens L24 having a concave surface toward the object side, the lenses being arranged in order from the object side along the optical axis. The positive meniscus lens L22 has aspherical lens surfaces on both sides. The negative meniscus lens L24 has an aspherical lens surface on the image side.

The third lens group G3 includes a negative meniscus lens L31 having a concave surface toward the object side. The negative meniscus lens L31 has aspherical lens surfaces on both sides.

The fourth lens group G4 includes a biconvex positive lens L41. The image surface I is disposed on the image side of the fourth lens group G4.

In the present example, the second lens group G2, the third lens group G3, and the fourth lens group G4 serve as the rear group GR having positive refractive power as a whole. The fourth lens group G4 corresponds to the final lens group GE disposed closest to the image side in the rear group GR. The positive lens L41 in the fourth lens group G4 corresponds to the final lens. Upon focusing on from an infinite distance object to a close distance object, the third lens group G3 moves to the image side along the optical axis.

Table 5 below lists data values of the zoom optical system according to the fifth example. Note that the sixth surface is a virtual surface.

TABLE 5

[General Data]

Zooming ratio = 1.272
IHw = 19.701 YLE1 = 14.910
fRw = 17.165 D1 = 6.219

| | W | T |
|---|---|---|
| f | 18.400 | 23.400 |
| FNO | 5.710 | 5.708 |
| 2ω | 99.996 | 85.06 |
| Ymax | 19.701 | 21.020 |
| TL | 49.709 | 50.616 |
| Bf | 8.603 | 12.351 |

[Lens Data]

| Surface Number | R | D | nd | νd | ED |
|---|---|---|---|---|---|
| 1 | −281.384 | 1.000 | 1.729160 | 54.61 | |
| 2 | 9.554 | 0.050 | 1.560930 | 36.64 | |
| 3* | 6.796 | 2.869 | | | |
| 4 | 13.179 | 2.300 | 1.902650 | 35.72 | |
| 5 | 35.513 | (D5) | | | |
| 6 | ∞ | 1.000 | | | |
| 7 | ∞ | 0.700 | | | (Aperture Stop S) |
| 8 | 6.899 | 3.043 | 1.496997 | 81.61 | |
| 9 | −42.666 | 0.476 | | | |
| 10* | 15.768 | 1.421 | 1.531131 | 55.75 | |
| 11* | 16.691 | 0.700 | | | |
| 12 | −25.255 | 2.160 | 1.496997 | 81.61 | |
| 13 | −6.778 | 0.900 | 1.882023 | 37.22 | |
| 14* | −20.575 | (D14) | | | |
| 15* | −10.893 | 1.200 | 1.882023 | 37.22 | |
| 16* | −15.024 | (D16) | | | |
| 17 | 111.885 | 2.987 | 1.953750 | 32.33 | 29.840 |
| 18 | −182.140 | Bf | | | 30.530 |

[Aspherical Surface Data]

3rd Surface

κ = 0.480, A4 = −7.8376E−05, A6 = −1.0021E−06,
A8 = 4.2191E−09, A10 = −2.0788E−10

10th Surface

κ = 1.000, A4 = −5.5094E−04, A6 = −3.0360E−06,
A8 = 6.0886E−08, A10 = 3.2465E−08

11th Surface

κ = 1.000, A4 = −8.3560E−04, A6 = −8.8381E−06,
A8 = 1.6661E−07, A10 = 7.8627E−08

14th Surface

κ = 1.000, A4 = 5.8322E−04, A6 = 1.2048E−05,
A8 = 2.4869E−07, A10 = −1.0244E−08

15th Surface

κ = 1.000, A4 = 3.4821E−04, A6 = −2.5826E−06,
A8 = 1.3777E−08, A10 = −1.0716E−10

16th Surface

κ = 1.000, A4 = 3.0694E−04, A6 = −2.1817E−06,
A8 = 4.7344E−09, A10 = −5.5702E−12

TABLE 5-continued

[Variable Distance Data]

| | W | M | T |
|---|---|---|---|
| Upon focusing on infinity | | | |
| Focal length | 18.400 | 20.000 | 23.400 |
| Distance | ∞ | ∞ | ∞ |
| D5 | 8.428 | 7.074 | 4.640 |
| D14 | 7.745 | 7.030 | 6.721 |
| D16 | 4.127 | 4.903 | 6.098 |
| Bf | 8.603 | 10.160 | 12.351 |
| Upon focusing on an intermediate distance object | | | |
| Magnification | −0.025 | −0.025 | −0.025 |
| Distance | 730.163 | 795.653 | 934.123 |
| D5 | 8.428 | 7.074 | 4.640 |
| D14 | 8.494 | 7.749 | 7.444 |
| D16 | 3.378 | 4.183 | 5.374 |
| Bf | 8.603 | 10.160 | 12.351 |
| Upon focusing on a very short distance object | | | |
| Magnification | −0.052 | −0.056 | −0.066 |
| Distance | 349.746 | 349.482 | 348.839 |
| D5 | 8.428 | 7.074 | 4.640 |
| D14 | 9.338 | 8.701 | 8.711 |
| D16 | 2.534 | 3.232 | 4.107 |
| Bf | 8.603 | 10.160 | 12.351 |

[Lens Group Data]

| Group | First surface | Focal length |
|---|---|---|
| G1 | 1 | −21.059 |
| G2 | 8 | 15.289 |
| G3 | 15 | −52.000 |
| G4 | 17 | 73.033 |

Figure 10A:
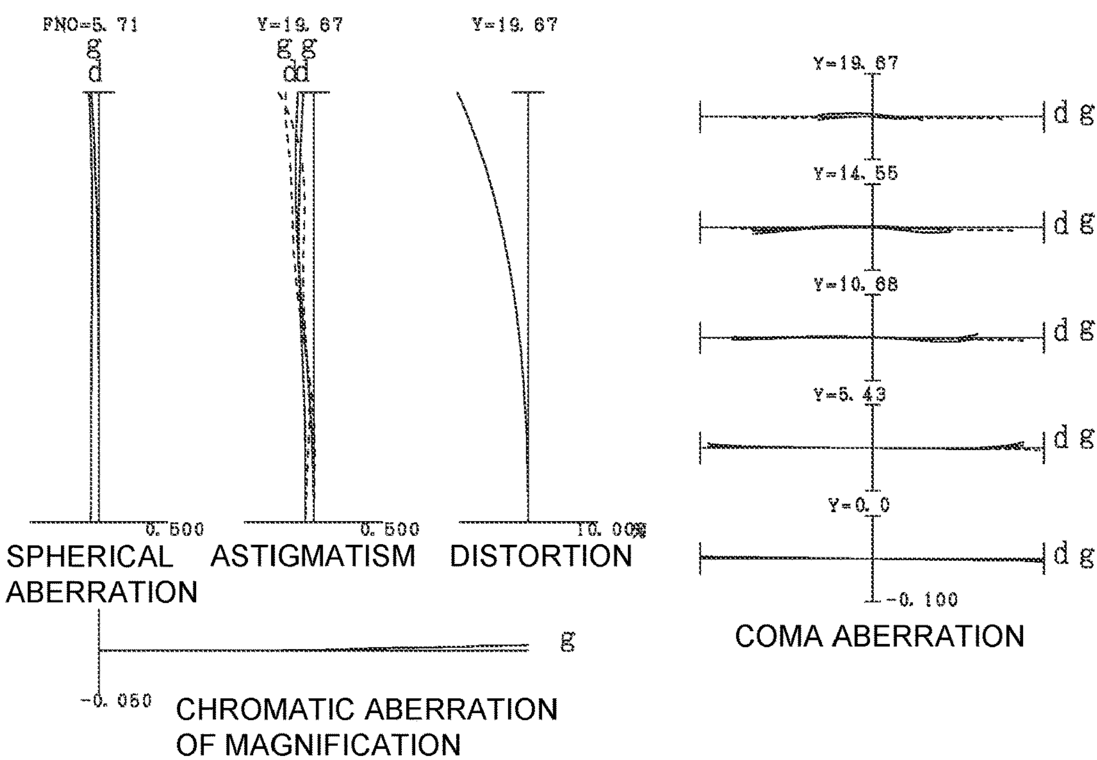
FIGS. 10A and 10B show a variety of aberration diagrams of the zoom optical system according to the fifth example upon focusing on infinity in a wide-angle end state and a telephoto end state, respectively.
Figure 10B:
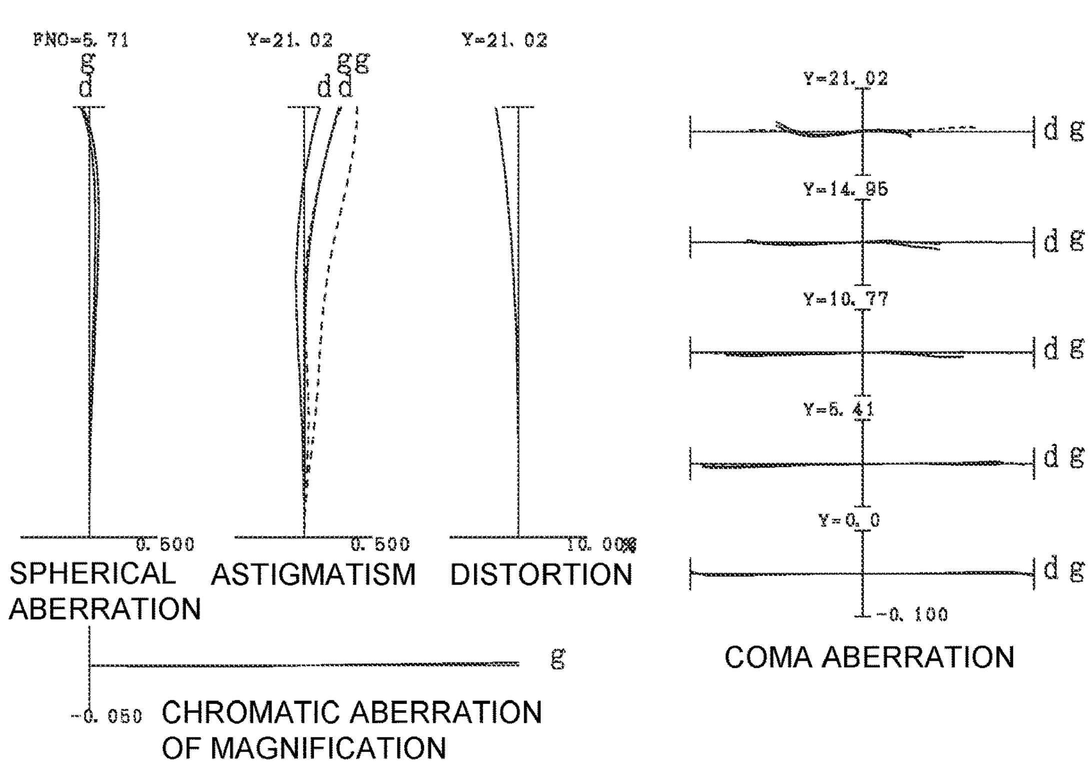

FIG. 10A shows a variety of aberration diagrams of the zoom optical system according to the fifth example upon focusing on infinity in the wide-angle end state. FIG. 10B shows a variety of aberration diagrams of the zoom optical system according to the fifth example upon focusing on infinity in the telephoto end state. From the variety of aberration diagrams, it can be understood that the zoom optical system according to the fifth example has a variety of aberrations excellently corrected in both the wide-angle end state and the telephoto end state and has excellent imaging performance.

The following presents a table of [Conditional expression correspondence value]. The table collectively lists values corresponding to Conditional Expressions (1) to (14) for all examples (first to fifth examples).

$$0.15 < ft/fGE < 0.60$$ Conditional Expression (1)

$$2.00 < TLt/IHw < 3.00$$ Conditional Expression (2)

$$1.00 < (-f1)/fRw < 1.50$$ Conditional Expression (3)

$$0.30 < Bfw/IHw < 0.60$$ Conditional Expression (4)

$$0.50 < YLE1/IHw < 1.00$$ Conditional Expression (5)

$$0.80 < (-f1)/fw < 1.40$$ Conditional Expression (6)

$$0.50 < f2/fw < 1.00$$ Conditional Expression (7)

$$0.60 < f2/fRw < 1.20$$ Conditional Expression (8)

$$1.10 < ft/fw < 1.50$$ Conditional Expression (9)

$$-1.50 < (L1r2 + L1r1)/(L1r2 - L1r1) < -0.60$$ Conditional Expression (10)

-continued $$-0.50 < (LEr2 + LEr2)/(LEr2 - LEr1) < 0.60$$ Conditional Expression (11)

$$88.00° < 2\omega w$$ Conditional Expression (12)

$$0.01 < D1/TLw < 0.20$$ Conditional Expression (13)

$$0.10 < Bfw/fw < 0.60$$ Conditional Expression (14)

[Conditional Expression Corresponding Value] (First to Third Example)

| Conditional Expression | First example | Second example | Third example |
|---|---|---|---|
| (1) | 0.336 | 0.327 | 0.373 |
| (2) | 2.519 | 2.508 | 2.543 |
| (3) | 1.201 | 1.263 | 1.222 |
| (4) | 0.442 | 0.436 | 0.444 |
| (5) | 0.759 | 0.755 | 0.740 |
| (6) | 1.118 | 1.200 | 1.102 |
| (7) | 0.812 | 0.837 | 0.767 |
| (8) | 0.872 | 0.881 | 0.850 |
| (9) | 1.272 | 1.272 | 1.272 |
| (10) | −0.962 | −0.863 | −1.117 |
| (11) | −0.186 | −0.193 | 0.113 |
| (12) | 100.18 | 98.96 | 100.44 |
| (13) | 0.127 | 0.073 | 0.161 |
| (14) | 0.472 | 0.466 | 0.470 |

[Conditional Expression Corresponding Value] (Fourth to Fifth Example)

| Conditional Expression | Fourth example | Fifth example |
|---|---|---|
| (1) | 0.394 | 0.320 |
| (2) | 2.520 | 2.569 |
| (3) | 1.272 | 1.227 |
| (4) | 0.439 | 0.437 |
| (5) | 0.754 | 0.757 |
| (6) | 1.133 | 1.145 |
| (7) | 0.819 | 0.831 |
| (8) | 0.919 | 0.891 |
| (9) | 1.272 | 1.272 |
| (10) | −1.233 | −0.934 |
| (11) | 0.345 | −0.239 |
| (12) | 100.57 | 100.00 |
| (13) | 0.159 | 0.125 |
| (14) | 0.468 | 0.468 |

According to each above-described example, it is possible to achieve a zoom optical system having a small size and bright and favorable optical performance.

The above-described examples are specific examples of the present application invention, and the present application invention is not limited thereto.

Contents of the following description may be applied as appropriate without losing the optical performance of a zoom optical system of the present embodiment.

Each above-described example of the zoom optical system of the present embodiment has a three-group configuration or a four-group configuration, but the present application is not limited thereto and the zoom optical system may have any other group configuration (for example, a five-group or six-group configuration). Specifically, a lens or a lens group may be added closest to the object side or the image surface side in the zoom optical system of the present embodiment. Note that a lens group means a part including at least one lens and separated at an air distance that changes upon zooming.

The focusing lens groups may perform focusing on from an infinite distance object to a close distance object by moving one or a plurality of lens groups or a partial lens group in the optical axis direction. The focusing lens groups are also applicable to automatic focusing and also suitable for automatic focusing motor drive (using an ultrasonic wave motor or the like).

A lens group or a partial lens group may be moved with a component in a direction orthogonal to the optical axis or may be rotationally moved (swung) in an in-plane direction including the optical axis, thereby achieving a vibration-proof lens group that corrects image blur causes by camera shake.

A lens surface may be so formed as to be a spherical surface, a flat surface, or an aspheric surface. In the case where a lens surface is a spherical or flat surface, the lens is readily processed, assembled, and adjusted, whereby degradation in the optical performance due to errors in the lens processing, assembly, and adjustment is preferably avoided. Further, even when an image plane is shifted, the amount of degradation in drawing performance is preferably small.

In the case where the lens surface is an aspheric surface, the aspheric surface may be any of a ground aspheric surface, a glass molded aspheric surface that is a glass surface so molded in a die as to have an aspheric shape, and a composite aspheric surface that is a glass surface on which aspherically shaped resin is formed. The lens surface may instead be a diffractive surface, or the lenses may be any of a distributed index lens (GRIN lens) or a plastic lens.

The aperture stop is preferably disposed between the first lens group and the second lens group, but no member as an aperture stop may be provided and the frame of a lens may serve as the aperture stop.

Each lens surface may be provided with an antireflection film having high transmittance over a wide wavelength range to achieve good optical performance that reduces flare and ghost and achieves high contrast.

EXPLANATION OF NUMERALS AND CHARACTERS

G1 first lens group
G2 second lens group
G3 third lens group
G4 fourth lens group
I image surface
S aperture stop

The invention claimed is:

1. A zoom optical system consisting of a first lens group having negative refractive power and a rear group comprising at least one lens group, which are arranged in order from an object side along an optical axis, wherein distances between the lens groups adjacent to each other change at zooming, the first lens group is fixed with respect to an image surface during zooming, the at least one lens group in the rear group includes a final lens group having positive refractive power and disposed closest to an image side in the rear group, and the following conditional expressions are satisfied:

$$0.15 < ft/fGE < 0.50$$

$$0.80 < (-f1)/fw < 1.27$$

where ft: a focal length of the zoom optical system in a telephoto end state, fGE: a focal length of the final lens group, f1: a focal length of the first lens group, and fw: a focal length of the zoom optical system in a wide-angle end state.

2. The zoom optical system according to claim 1, wherein the following conditional expression is satisfied:

$$2.00 < TLt/IHw < 3.00$$

where

TLt: an entire length of the zoom optical system in the telephoto end state, and IHw: a maximum image height of the zoom optical system in a wide-angle end state.

3. The zoom optical system according to claim 1, wherein the following conditional expression is satisfied:

$$1.00 < (-f1)/fRw < 1.50$$

where fRw: a focal length of the rear group in a wide-angle end state.

4. The zoom optical system according to claim 1, wherein the following conditional expression is satisfied:

$$0.30 < Bfw/IHw < 0.60$$

where

Bfw: a back focus of the zoom optical system in a wide-angle end state, and

IHw: a maximum image height of the zoom optical system in the wide-angle end state.

5. The zoom optical system according to claim 1, wherein the following conditional expression is satisfied:

$$0.50 < YLE1/IHw < 1.00$$

where

YLE1: an effective radius of a lens surface of a lens disposed closest to the image side in the zoom optical system, the lens surface being positioned on the object side, and IHw: a maximum image height of the zoom optical system in a wide-angle end state.

6. The zoom optical system according to claim 1, wherein the at least one lens group in the rear group includes a second lens group having positive refractive power and disposed closest to the object side in the rear group, and the following conditional expression is satisfied:

$$0.50 < f2/2w < 1.00$$

where f2: a focal length of the second lens group.

7. The zoom optical system according to claim 1, wherein the at least one lens group in the rear group includes a second lens group having positive refractive power and disposed closest to the object side in the rear group, and the following conditional expression is satisfied:

$$0.60 < f2/2Rw < 1.20$$

where f2: a focal length of the second lens group, and fRw: a focal length of the rear group in a wide-angle end state.

8. The zoom optical system according to claim 1, wherein the following conditional expression is satisfied:

$$1.10 < \mathrm{ft}/fw < 1.50.$$

9. The zoom optical system according to claim 1, wherein the following conditional expression is satisfied:

$$-1.50 < (L1r2 + L1r1)/(L1r2 - L1r1) < -0.60$$

where

L1r1: a radius of curvature of a lens surface of a lens disposed closest to the object side in the zoom optical system, the lens surface being positioned on the object side, and L1r2: a radius of curvature of a lens surface of the lens disposed closest to the object side in the zoom optical system, the lens surface being positioned on the image side.

10. The zoom optical system according to claim 1, wherein the following conditional expression is satisfied:

$$-0.50 < (LEr2 + LEr1)/(LEr2 - LEr1) < 0.60$$

where

LEr1: a radius of curvature of a lens surface of a lens disposed closest to the image side in the zoom optical system, the lens surface being positioned on the object side, and LEr2: a radius of curvature of a lens surface of the lens disposed closest to the image side in the zoom optical system, the lens surface being positioned on the image side.

11. The zoom optical system according to claim 1, in combination with an aperture stop disposed between the first lens group and the rear group.

12. The zoom optical system according to claim 1, wherein the following conditional expression is satisfied:

$$88.00° < 2\omega w$$

where

2ωw: a full angle of view of the zoom optical system in a wide-angle end state.

13. The zoom optical system according to claim 1, wherein the following conditional expression is satisfied:

$$0.01 < D1/TLw < 0.20$$

where

D1: a thickness of the first lens group on the optical axis, and

TLw: an entire length of the zoom optical system in a wide-angle end state.

14. The zoom optical system according to claim 1, wherein the following conditional expression is satisfied:

$$0.10 < Bfw/fw < 0.60$$

where

Bfw: a back focus of the zoom optical system in a wide-angle end state.

15. An optical apparatus comprising the zoom optical system according to claim 1.

16. The zoom optical system according to claim 1, wherein the rear group comprises a focusing lens, which is a meniscus lens having a convex surface facing the image side.

17. A zoom optical system consisting of a first lens group having negative refractive power and a rear group comprising at least one lens group, which are arranged in order from an object side along an optical axis, wherein distances between the lens groups adjacent to each other change at zooming, the first lens group is fixed with respect to an image surface during zooming, all lens groups in the rear group move along the optical axis during zooming, and the following conditional expressions are satisfied:

$$2.00 < TLt/IHw < 3.00$$

$$1.00 < (-f1)/fRw < 1.50$$

where

TLt: an entire length of the zoom optical system in a telephoto end state,

IHw: a maximum image height of the zoom optical system in a wide-angle end state, f1: a focal length of the first lens group, and fRw: a focal length of the rear group in the wide-angle end state.

18. The zoom optical system according to claim 17, wherein the at least one lens group in the rear group includes a final lens group having positive refractive power and disposed closest to an image side in the rear group.

19. The zoom optical system according to claim 17, wherein the rear group comprises a focusing lens, which is a meniscus lens having a convex surface facing the image side.

20. A method for manufacturing a zoom optical system consisting of a first lens group having negative refractive power and a rear group comprising at least one lens group, which are arranged in order from an object side along an optical axis, the method comprising one of the following steps A or B, wherein the step A comprises disposing the lens groups in a lens barrel so that:

distances between the lens groups adjacent to each other change at zooming, the first lens group is fixed with respect to an image surface during zooming, the at least one lens group in the rear group includes a final lens group having positive refractive power and disposed closest to an image side in the rear group, and the following conditional expressions are satisfied:

$$0.15 < ft/fGE < 0.50$$

$$0.80 < (-fl)/fw > 1.27$$

where ft: a focal length of the zoom optical system in a telephoto end state, fGE: a focal length of the final lens group, f1: a focal length of the first lens group, and fw: a focal length of the zoom optical system in a wide-angle end state, and the step B comprises disposing the lens groups in a lens barrel so that:

distances between the lens groups adjacent to each other change at zooming, the first lens group is fixed with respect to an image surface during zooming, all lens groups in the rear group move along the optical axis during zooming, and the following conditional expressions are satisfied:

$$2.00 < TLt/IHw < 3.00$$

$$1.00 < (-f1)/fRw < 1.50$$

where

TLt: an entire length of the zoom optical system in the telephoto end state,

IHw: a maximum image height of the zoom optical system in a wide-angle end state, f1: a focal length of the first lens group, and fRw: a focal length of the rear group in the wide-angle end state.

* * * * *